US012795258B2

(12) United States Patent
Takahashi et al.

(10) Patent No.: US 12,795,258 B2
(45) Date of Patent: Nov. 10, 2026

(54) IMAGE CAPTURE ELEMENT AND IMAGE CAPTURE APPARATUS

(71) Applicant: NIKON CORPORATION, Tokyo (JP)

(72) Inventors: Masaya Takahashi, Tokyo (JP); Yu Morioka, Fujimi (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/599,853

(22) PCT Filed: Mar. 29, 2019

(86) PCT No.: PCT/JP2019/014391

§ 371 (c)(1),
(2) Date: Jan. 10, 2022

(87) PCT Pub. No.: WO2020/202409

PCT Pub. Date: Oct. 8, 2020

(65) Prior Publication Data

US 2022/0247950 A1 Aug. 4, 2022

(51) Int. Cl.
*H04N 25/633* (2023.01)
*H04N 25/673* (2023.01)

(52) U.S. Cl.
CPC ......... *H04N 25/633* (2023.01); *H04N 25/673* (2023.01)

(58) Field of Classification Search
CPC .. H04N 5/36963; H04N 5/361; H04N 5/3651; H04N 5/3535; H04N 5/35545;
(Continued)

(56) References Cited

U.S. PATENT DOCUMENTS 7,907,190 B2 * 3/2011 Kosover .............. H04N 5/3653 348/241
8,698,922 B2 * 4/2014 Zhang .................... H04N 25/63 348/243
(Continued)

FOREIGN PATENT DOCUMENTS

JP 2006-303856 A 11/2006
JP 2016-051949 A 4/2016
(Continued)

OTHER PUBLICATIONS

Oct. 31, 2022 Search Report issued in European Patent Application No. 19923111.9.
(Continued)

*Primary Examiner* — Albert H Cutler
(74) *Attorney, Agent, or Firm* — Oliff PLC

(57) ABSTRACT

An image capture element includes: an imaging region having a plurality of first pixels that include a first photoelectric conversion unit and a first circuit unit that is connected to the first photoelectric conversion unit; and a first control line that is connected to the plurality of first pixels, and to which a signal that controls the plurality of first pixels is outputted; and a plurality of light-shielding pixel regions having: a plurality of second pixels that include a second photoelectric conversion unit that is shielded from light and a second circuit unit, wherein the light-shielding pixel region includes therein all of the first pixels in the imaging region that are connected to the first control line of the imaging region, and is arranged outside of a closed region specified such that an outer edge thereof is a minimum length.

17 Claims, 27 Drawing Sheets

(58) Field of Classification Search
CPC ........... H04N 5/35554; H04N 5/35563; H04N 25/633; H04N 25/63; H04N 25/671
USPC .......................................................... 348/245
See application file for complete search history.

(56) References Cited

U.S. PATENT DOCUMENTS

| | | | | |
|---|---|---|---|---|
| 8,854,507 | B2 * | 10/2014 | Joboji | H04N 5/378 348/241 |
| 9,627,423 | B2 | 4/2017 | Takada et al. | |
| 12,077,786 | B2 | 9/2024 | Young et al. | |
| 2003/0160772 | A1 * | 8/2003 | Kunimi | H04N 25/713 348/E5.079 |
| 2006/0237629 | A1 | 10/2006 | Oda | |
| 2006/0237721 | A1 | 10/2006 | Muramatsu et al. | |
| 2007/0273785 | A1 | 11/2007 | Ogawa et al. | |
| 2010/0097501 | A1 | 4/2010 | Fowler | |
| 2010/0128150 | A1 | 5/2010 | Taguchi | |
| 2016/0064442 | A1 | 3/2016 | Takada et al. | |
| 2018/0024313 | A1 * | 1/2018 | Uchida | H04N 5/349 382/255 |
| 2019/0007636 | A1 * | 1/2019 | Kim | H04N 25/772 |
| 2019/0028661 | A1 | 1/2019 | Nikai | |
| 2019/0191112 | A1 * | 6/2019 | Shigiya | H04N 5/3765 |
| 2019/0239731 | A1 | 8/2019 | Hanzawa | |
| 2020/0021769 | A1 * | 1/2020 | Niwa | H04N 25/40 |
| 2020/0221043 | A1 | 7/2020 | Sato | |
| 2022/0247950 | A1 | 8/2022 | Takahashi et al. | |
| 2023/0174971 | A1 | 6/2023 | Young et al. | |
| 2024/0401003 | A1 | 12/2024 | Young et al. | |

FOREIGN PATENT DOCUMENTS

| | | | |
|---|---|---|---|
| JP | 2017-118342 | A | 6/2017 |
| JP | 2018-160830 | A | 10/2018 |
| JP | 2021-511781 | A | 5/2021 |
| JP | 7380678 | B2 | 11/2023 |
| WO | 2018/020857 | A1 | 2/2018 |
| WO | 2019/026632 | A1 | 2/2019 |

OTHER PUBLICATIONS

Jun. 18, 2019 Search Report issued in International Patent Application No. PCT/JP2019/014391.
Jul. 11, 2023 Office Action issued in European Patent Application No. 19 923 111.9.
May 17, 2024 Office Action issued in European Patent Application No. 19 923 111.9.
Oct. 25, 2024 Record of Telephone Consulation issued in European Patent Application No. 19 923 111.9.
Jan. 7, 2025 Office Action issued in Japanese Patent Application No. 2023-188343.
Jun. 17, 2025 Partial European Search Report issued in European Patent Application No. 25171007.5.

* cited by examiner

CORRECTION TABLE 1400

1401 1402 1403 1404 1405

| REFERENCE ORIGIN IMAGING REGION | REFERENCE ORIGIN CONTROL CONDITION | REFERENCE DESTINATION NON-IMAGING REGION | REFERENCE DESTINATION CONTROL CONDITION | CORRELATION VALUE |
|---|---|---|---|---|
| 600-11 | A | 610-L1 | A | r(11A,L1A) |
| | | | B | r(11A,L1B) |
| | | | C | r(11A,L1C) |
| | | | D | r(11A,L1D) |
| | B | 610-L1 | A | r(11B,L1A) |
| | | | B | r(11B,L1B) |
| | | | C | r(11B,L1C) |
| | | | D | r(11B,L1D) |
| | C | 610-L1 | A | r(11C,L1A) |
| | | | B | r(11C,L1B) |
| | | | C | r(11C,L1C) |
| | | | D | r(11C,L1D) |
| | D | 610-L1 | A | r(11D,L1A) |
| | | | B | r(11D,L1B) |
| | | | C | r(11D,L1C) |
| | | | D | r(11D,L1D) |
| 600-12 | A | 610-L1 | A | r(12A,L1A) |
| | | | B | r(12A,L1B) |
| | | | C | r(12A,L1C) |
| | | | D | r(12A,L1D) |
| | B | 610-L1 | A | r(12B,L1A) |
| | | | B | r(12B,L1B) |
| | | | C | r(12B,L1C) |
| | | | D | r(12B,L1D) |
| | C | 610-L1 | A | r(12C,L1A) |
| | | | B | r(12C,L1B) |
| | | | C | r(12C,L1C) |
| | | | D | r(12C,L1D) |
| | D | 610-L1 | A | r(12D,L1A) |
| | | | B | r(12D,L1B) |
| | | | C | r(12D,L1C) |
| | | | D | r(12D,L1D) |
| ... | ... | ... | ... | ... |

*FIG. 14*

CORRECTION TABLE 1900

| REFERENCE ORIGIN IMAGING REGION (1401) | REFERENCE ORIGIN CONTROL CONDITION (1402) | REFERENCE DESTINATION NON-IMAGING REGION (1403) | REFERENCE DESTINATION CONTROL CONDITION (1404) | CORRELATION VALUE (1405) |
|---|---|---|---|---|
| 600-11 | A | 610-C1 | A | r(11A,C1A) |
| | | | B | r(11A,C1B) |
| | | | C | r(11A,C1C) |
| | | | D | r(11A,C1D) |
| | B | 610-C1 | A | r(11B,C1A) |
| | | | B | r(11B,C1B) |
| | | | C | r(11B,C1C) |
| | | | D | r(11B,C1D) |
| | C | 610-C1 | A | r(11C,C1A) |
| | | | B | r(11C,C1B) |
| | | | C | r(11C,C1C) |
| | | | D | r(11C,C1D) |
| | D | 610-C1 | A | r(11D,C1A) |
| | | | B | r(11D,C1B) |
| | | | C | r(11D,C1C) |
| | | | D | r(11D,C1D) |
| 600-12 | A | 610-C1 | A | r(12A,C1A) |
| | | | B | r(12A,C1B) |
| | | | C | r(12A,C1C) |
| | | | D | r(12A,C1D) |
| | B | 610-C1 | A | r(12B,C1A) |
| | | | B | r(12B,C1B) |
| | | | C | r(12B,C1C) |
| | | | D | r(12B,C1D) |
| | C | 610-C1 | A | r(12C,C1A) |
| | | | B | r(12C,C1B) |
| | | | C | r(12C,C1C) |
| | | | D | r(12C,C1D) |
| | D | 610-C1 | A | r(12D,C1A) |
| | | | B | r(12D,C1B) |
| | | | C | r(12D,C1C) |
| | | | D | r(12D,C1D) |
| ... | ... | ... | ... | ... |

*FIG. 19*

CORRECTION TABLE 2500

1401 1402 1403 1404 1405

| REFERENCE ORIGIN IMAGING REGION | REFERENCE ORIGIN CONTROL CONDITION | REFERENCE DESTINATION NON-IMAGING REGION | REFERENCE DESTINATION CONTROL CONDITION | CORRELATION VALUE |
|---|---|---|---|---|
| 600-11 | A | 610-11 | A | r(11A,11A) |
| | | | B | r(11A,11B) |
| | | | C | r(11A,11C) |
| | | | D | r(11A,11D) |
| | B | 610-11 | A | r(11B,11A) |
| | | | B | r(11B,11B) |
| | | | C | r(11B,11C) |
| | | | D | r(11B,11D) |
| | C | 610-11 | A | r(11C,11A) |
| | | | B | r(11C,11B) |
| | | | C | r(11C,11C) |
| | | | D | r(11C,11D) |
| | D | 610-11 | A | r(11D,11A) |
| | | | B | r(11D,11B) |
| | | | C | r(11D,11C) |
| | | | D | r(11D,11D) |
| 600-12 | A | 610-11 | A | r(12A,11A) |
| | | | B | r(12A,11B) |
| | | | C | r(12A,11C) |
| | | | D | r(12A,11D) |
| | B | 610-11 | A | r(12B,11A) |
| | | | B | r(12B,11B) |
| | | | C | r(12B,11C) |
| | | | D | r(12B,11D) |
| | C | 610-11 | A | r(12C,11A) |
| | | | B | r(12C,11B) |
| | | | C | r(12C,11C) |
| | | | D | r(12C,11D) |
| | D | 610-11 | A | r(12D,11A) |
| | | | B | r(12D,11B) |
| | | | C | r(12D,11C) |
| | | | D | r(12D,11D) |
| ... | ... | ... | ... | ... |

FIG.25

CORRECTION TABLE 2700

1401 1402 1403 1404 1405

| REFERENCE ORIGIN IMAGING REGION | REFERENCE ORIGIN CONTROL CONDITION | REFERENCE DESTINATION NON-IMAGING REGION | REFERENCE DESTINATION CONTROL CONDITION | CORRELATION VALUE |
|---|---|---|---|---|
| ... | ... | ... | ... | ... |
| 600-21 | A | 610-11 | A | r(21A,11A) |
| | | | B | r(21A,11B) |
| | | | C | r(21A,11C) |
| | | | D | r(21A,11D) |
| | B | 610-11 | A | r(21B,11A) |
| | | | B | r(21B,11B) |
| | | | C | r(21B,11C) |
| | | | D | r(21B,11D) |
| | C | 610-11 | A | r(21C,11A) |
| | | | B | r(21C,11B) |
| | | | C | r(21C,11C) |
| | | | D | r(21C,11D) |
| | D | 610-11 | A | r(21D,11A) |
| | | | B | r(21D,11B) |
| | | | C | r(21D,11C) |
| | | | D | r(21D,11D) |
| 600-22 | A | 610-L1 | A | r(22A,L1A) |
| | | | B | r(22A,L1B) |
| | | | C | r(22A,L1C) |
| | | | D | r(22A,L1D) |
| | B | 610-L1 | A | r(22B,L1A) |
| | | | B | r(22B,L1B) |
| | | | C | r(22B,L1C) |
| | | | D | r(22B,L1D) |
| | C | 610-L1 | A | r(22C,L1A) |
| | | | B | r(22C,L1B) |
| | | | C | r(22C,L1C) |
| | | | D | r(22C,L1D) |
| | D | 610-L1 | A | r(22D,L1A) |
| | | | B | r(22D,L1B) |
| | | | C | r(22D,L1C) |
| | | | D | r(22D,L1D) |
| ... | ... | ... | ... | ... |

*FIG.27*

IMAGE CAPTURE ELEMENT AND IMAGE CAPTURE APPARATUS

BACKGROUND

The present invention relates to an image capture element and an image capture apparatus.

JP 2006-303856 A discloses a charge-coupled device having an optical black region in which photodiodes are disposed and an optical black region in which photodiodes are not disposed. However, in the charge-coupled device of Patent Document 1, a plurality of pixel regions having differing control conditions set thereto are not considered.

SUMMARY

An image capture element comprises: an imaging region having: a plurality of first pixels that include a first photoelectric conversion unit configured to receive light from an optical system and convert the light to an electric charge and a first circuit unit that is connected to the first photoelectric conversion unit, the first pixels being arrayed in a first direction and a second direction that intersects with the first direction; and a first control line that is connected to the plurality of first pixels, and to which a signal that controls the plurality of first pixels is outputted; and a plurality of light-shielding pixel regions having: a plurality of second pixels that include a second photoelectric conversion unit that is shielded from light and a second circuit unit that is connected to the second photoelectric conversion unit, the second pixels being arrayed in the first direction and the second direction; and a second control line that is connected to the plurality of second pixels, and to which a signal that controls the second pixels is outputted, wherein the light-shielding pixel region includes therein all of the first pixels in the imaging region that are connected to the first control line of the imaging region, and is arranged outside of a closed region specified such that an outer edge thereof is a minimum length.

BRIEF DESCRIPTION OF THE DRAWINGS

FIG. 14 is a descriptive drawing showing an example of a correction table according to Embodiment 2.

FIG. 19 is a descriptive drawing showing an example of a correction table according to Embodiment 4.

FIG. 25 is a descriptive drawing showing an example of a correction table according to Embodiment 6.

FIG. 27 is a descriptive drawing showing an example of a correction table according to Embodiment 7.

DETAILED DESCRIPTION OF THE EMBODIMENTS

Configuration Example of Image Capture Element

The image capture element installed in the electronic apparatus described in the embodiments of the present specification is a laminated image capture element. This laminated image capture element can have differing imaging conditions (control conditions) set for each of a plurality of different imaging regions. First, the structure of a laminated image capture element for which differing imaging conditions (control conditions) can be set for each of the plurality of different imaging regions will be described. It is noted that this layered image capture element is disclosed in Japanese Unexamined Patent Application Publication No. 2012-139026 previously applied by the applicant of this application. The electronic device is an image capture apparatus such as a digital camera or a digital video camera.

Figure 1:
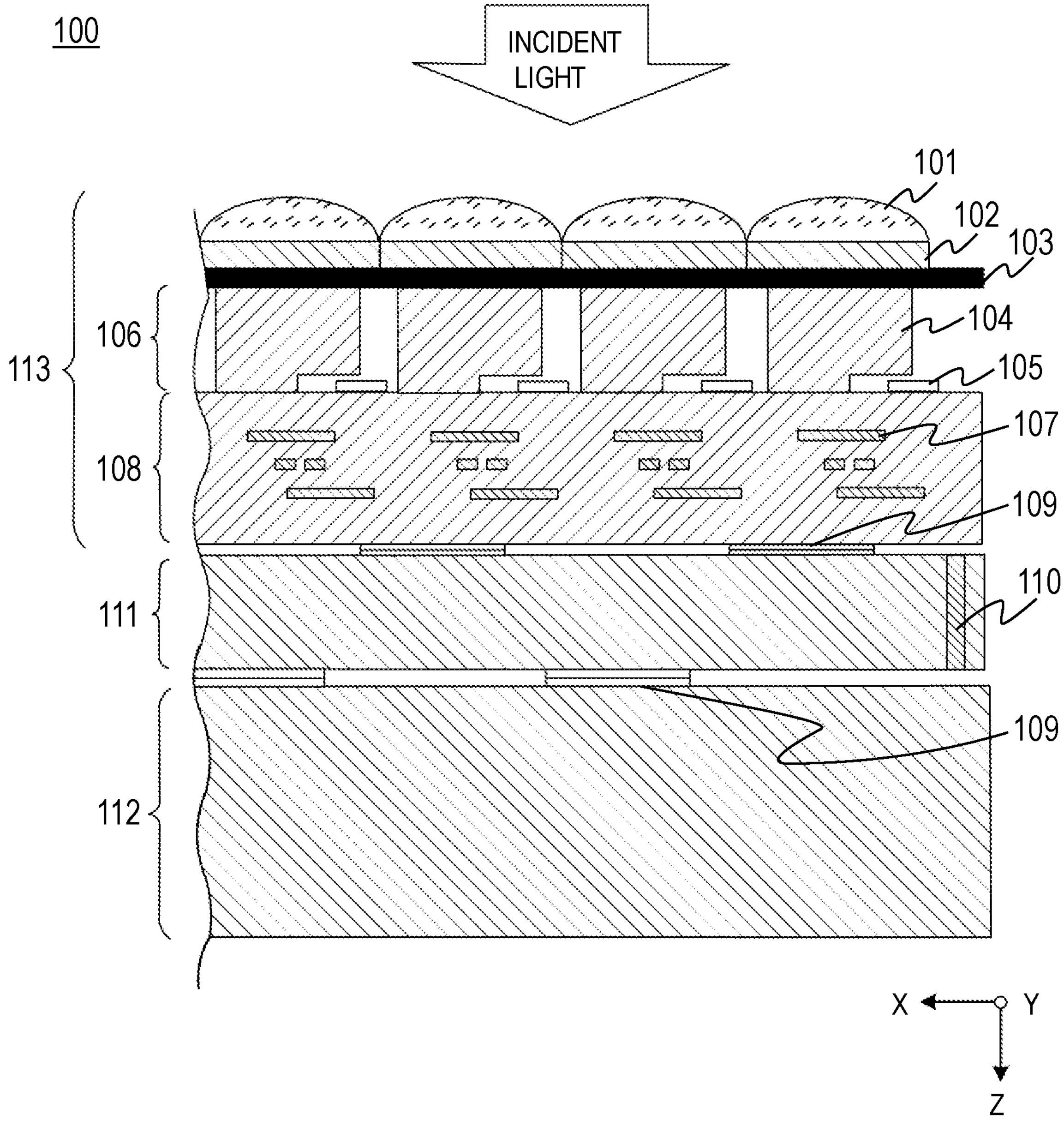
FIG. 1 is a cross-sectional view of a layered the image capture element.

FIG. 1 is a cross-sectional view of a layered the image capture element 100. The layered image capture element (hereinafter simply referred to as "image capture element") 100 includes a backside illumination-type imaging chip to output a pixel signal corresponding to incident light (hereinafter simply referred to as "imaging chip") 113, a signal processing chip 111 to process a pixel signal, and a memory chip 112 to store a pixel signal. The imaging chip 113, the signal processing chip 111, and the memory chip 112 are layered and are electrically connected by a bump 109 made of conductive material such as Cu.

As shown in FIG. 1, the incident light is inputted in a positive direction in the Z axis mainly shown by the outlined arrow. In this embodiment, the imaging chip 113 is configured so that a face to which the incident light is inputted is called a back face. As shown by the coordinate axes 120, a left direction orthogonal to Z axis when viewed on the paper is a positive X axis direction and a front direction orthogonal to the Z axis and the X axis when viewed on the paper is a positive Y axis direction. In some of the subsequent drawings, the coordinate axes are shown so as to show the directions of the drawings based on the coordinate axes of FIG. 1 as a reference.

One example of the imaging chip 113 is a backside illumination-type MOS (Metal Oxide Semiconductor) image sensor. A PD (photo diode) layer 106 is provided at the back face side of a wiring layer 108. The PD layer 106 is provided in a two-dimensional manner and has a plurality of PDs 104 in which the electric charge depending on the incident light is accumulated and transistors 105 provided to correspond to the PDs 104.

The side at which the PD layer 106 receives the incident light has color filters 102 via a passivation film 103. The color filters 102 have a plurality of types to allow light to be transmitted through wavelength regions different from one another. The color filters 102 have a specific arrangement corresponding to the respective PDs 104. The arrangement of the color filters 102 will be described later. A combination of the color filter 102, the PD 104, and the transistor 105 constitutes one pixel.

A side at which the color filter 102 receives the incident light has a microlens 101 corresponding to each pixel. The microlens 101 collects the incident light toward the corresponding PD 104.

The wiring layer 108 has a wiring 107 to transmit a pixel signal from the PD layer 106 to the signal processing chip 111. The wiring 107 may have a multi-layer structure or may include a passive element and an active element.

A surface of the wiring layer 108 has thereon a plurality of bumps 109. The plurality of bumps 109 are aligned with a plurality of bumps 109 provided on an opposing face of the signal processing chip 111. The pressurization of the imaging chip 113 and the signal processing chip 111 for example causes the aligned bumps 109 to be bonded to have an electrical connection therebetween.

Similarly, the signal processing chip 111 and the memory chip 112 have therebetween faces opposed to each other that have thereon a plurality of bumps 109. These bumps 109 are mutually aligned and the pressurization of the signal processing chip 111 and the memory chip 112 for example causes the aligned bumps 109 to be bonded to have an electrical connection therebetween.

The bonding between the bumps 109 is not limited to a Cu bump bonding by the solid phase diffusion and may use a micro bump coupling by the solder melting. One bump 109 may be provided relative to one block (which will be described later) for example. Thus, the bump 109 may have a size larger than the pitch of the PD 104. Surrounding regions other than a pixel region in which pixels are arranged may additionally have a bump larger than the bump 109 corresponding to the pixel region.

The signal processing chip 111 has a TSV (silicon through-electrode) 110 to provide the mutual connection among circuits provided on the top and back faces, respectively. The TSV 110 is preferably provided in the surrounding region. The TSV 110 also may be provided in the surrounding region of the imaging chip 113 and the memory chip 112.

Figure 2:
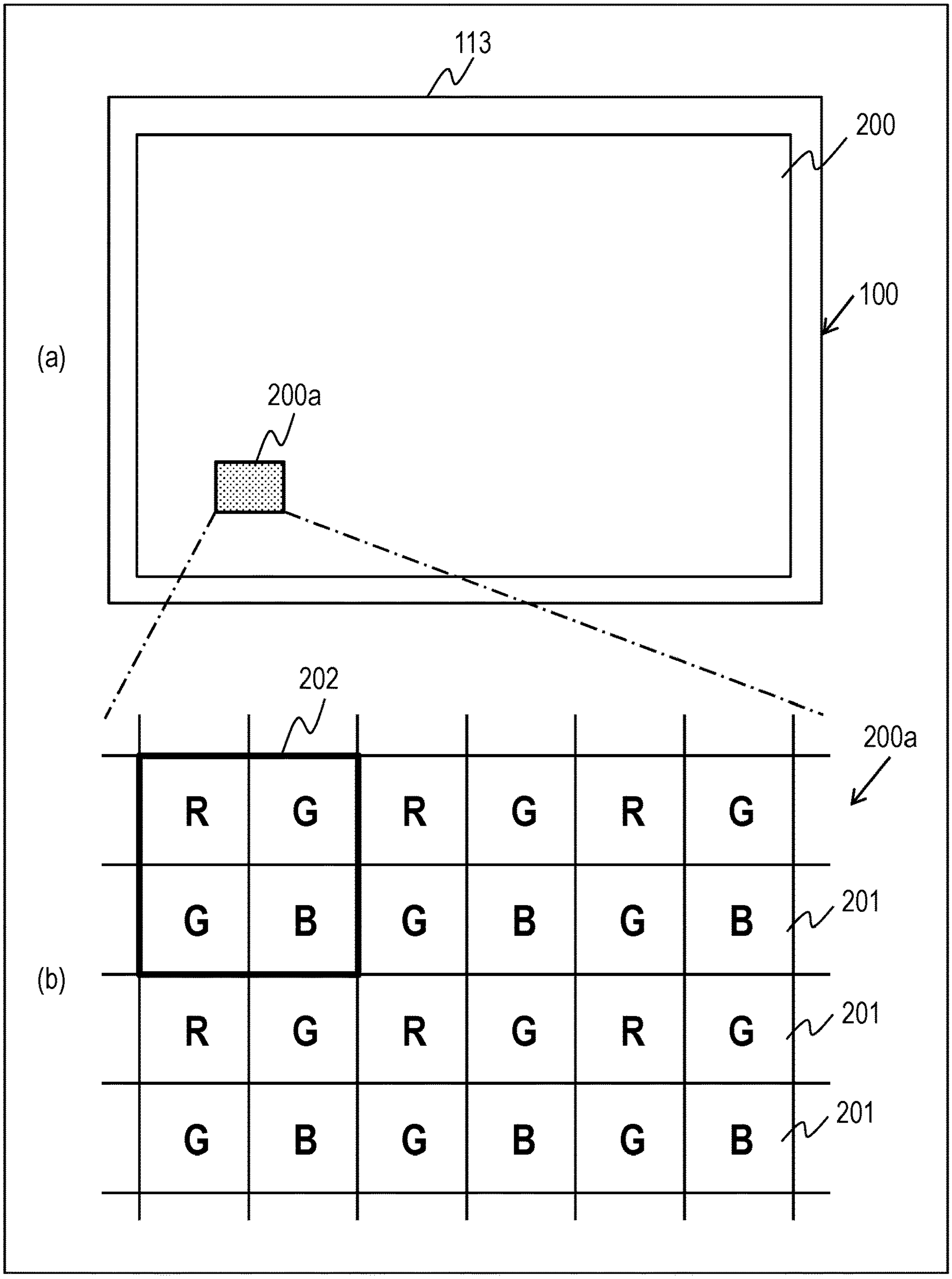
FIG. 2 illustrates the pixel arrangement of the imaging chip.

FIG. 2 illustrates the pixel arrangement of the imaging chip 113. In particular, (a) and (b) of FIG. 2 illustrate the imaging chip 113 observed from the back face side. In FIG. 2, (a) of FIG. 2 is a plan view schematically illustrating an imaging face 200 that is a back face of the imaging chip 113. In FIG. 2, (b) of FIG. 2 is an enlarged plan view illustrating a partial region 200*a* of the imaging face 200. As shown in (b) of FIG. 2, the imaging face 200 has many pixels 201 arranged in a two-dimensional manner.

The pixels 201 have color filter (not shown), respectively. The color filters consist of the three types of red (R), green (G), and blue (B). In (b) of FIG. 2, the reference numerals "R", "G", and "B" show the types of color filters owned by the pixels 201. As shown in (b) of FIG. 2, the image capture element 100 has the imaging face 200 on which the pixels 201 including the respective color filters as described above are arranged based on a so-called Bayer arrangement.

The pixel 201 having a red filter subjects red waveband light of the incident light to a photoelectric conversion to output a light reception signal (photoelectric conversion signal). Similarly, the pixel 201 having a green filter subjects green waveband light of the incident light to a photoelectric conversion to output a light reception signal. The pixel 201 having a blue filter subjects blue waveband light of the incident light to a photoelectric conversion to output a light reception signal.

The image capture element 100 is configured so that a block 202 consisting of the total of pixels 201 composed of 2 pixels×2 pixels adjacent to one another can be individually controlled. For example, when two blocks 202 different from each other simultaneously start the electric charge accumulation, then one block 202 starts the electric charge reading (i.e., the light reception signal reading) after 1/30 seconds from the start of the electric charge accumulation and the another block 202 starts the electric charge reading after 1/15 seconds from the start of the electric charge accumulation. In other words, the image capture element 100 is configured so that one imaging operation can have a different exposure time (or an electric charge accumulation time or a so-called shutter speed) for each block 202.

The image capture element 100 also can set, in addition to the above-described exposure time, an imaging signal amplification factor (a so-called ISO sensibility) that is different for each block 202. The image capture element 100 can have, for each block 202, a different timing at which the electric charge accumulation is started and/or a different timing at which the light reception signal is read. Specifically, the image capture element 100 can have a different video imaging frame rate for each block 202.

In summary, the image capture element 100 is configured so that each block 202 has different imaging conditions such as the exposure time, the amplification factor, or the frame rate. For example, a reading line (not shown) to read an imaging signal from a photoelectric conversion unit (not shown) owned by the pixel 201 is provided for each block 202 and an imaging signal can be read independently for each block 202, thereby allowing each block 202 to have a different exposure time (shutter speed).

An amplifier circuit (not shown) to amplify the imaging signal generated by the electric charge subjected to the photoelectric conversion is independently provided for each block 202. The amplification factor by the amplifier circuit can be controlled independently for each amplifier circuit, thereby allowing each block 202 to have a different signal amplification factor (ISO sensibility).

The imaging conditions that can be different for each block 202 may include, in addition to the above-described imaging conditions, the frame rate, a gain, a resolution (thinning rate), an addition line number or an addition row number to add pixel signals, the electric charge accumulation time or the accumulation number, and a digitization bit number for example. Furthermore, a control parameter may be a parameter in an image processing after an image signal is acquired from a pixel.

Regarding the imaging conditions, the brightness (diaphragm value) of each block 202 can be controlled by allowing the image capture element 100 to include a liquid crystal panel having a zone that can be independently controlled for each block 202 (one zone corresponds to one block 202) so that the liquid crystal panel is used as a light attenuation filter that can be turned ON or OFF for example.

The number of the pixels 201 constituting the block 202 is not limited to the above-described 4 (or 2×2) pixels. The block 202 may have at least one pixel 201 or may include more-than-four pixels 201.

Figure 3:
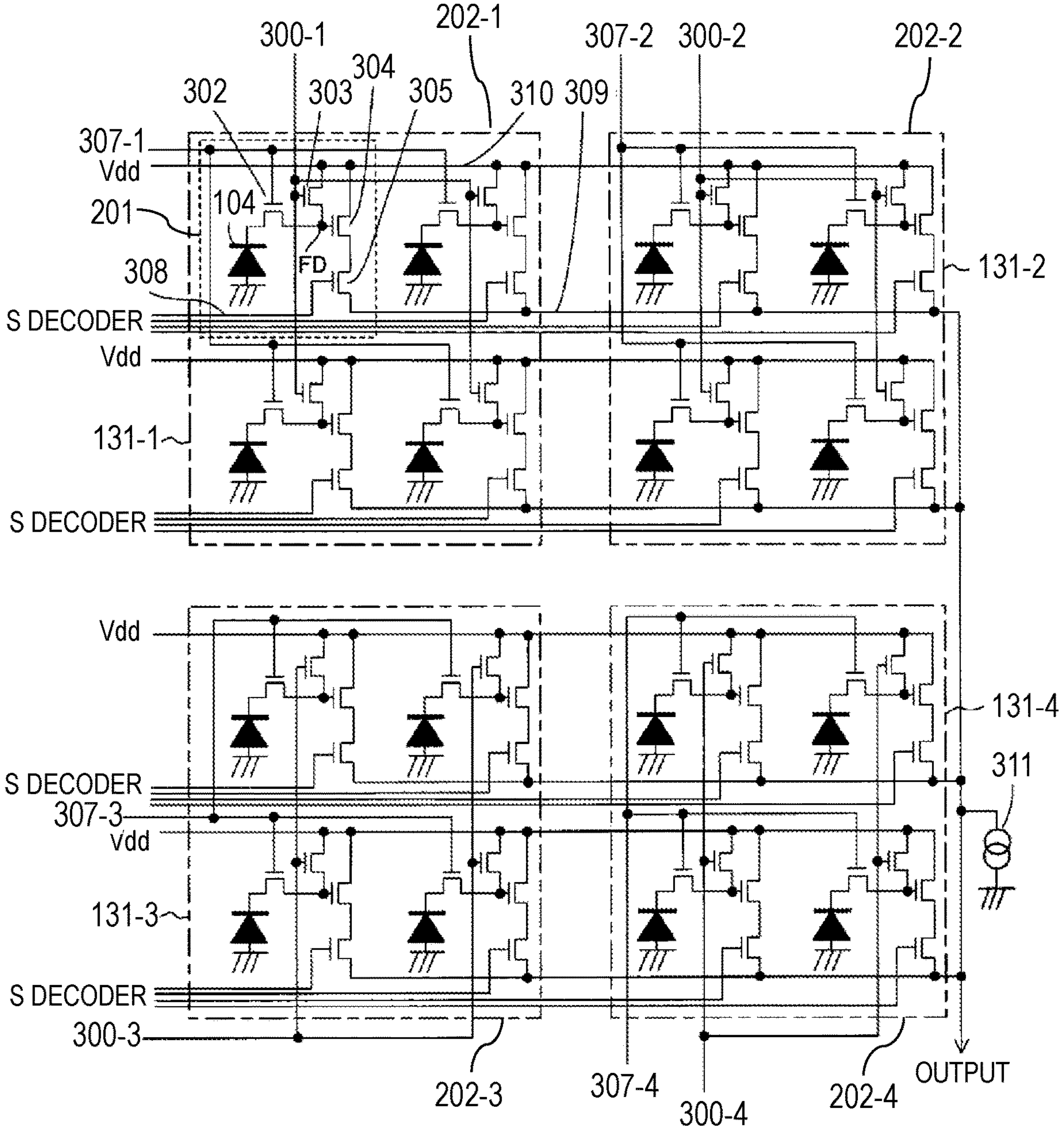
FIG. 3 is a circuit diagram illustrating the imaging chip.

FIG. 3 is a circuit diagram illustrating the imaging chip 113. In FIG. 3, a rectangle shown by the dotted line representatively shows a circuit corresponding to one pixel 201. A rectangle shown by a dashed line corresponds to one block 202 (202-1 to 202-4). At least a part of each transistor described below corresponds to the transistor 105 of FIG. 1.

As described above, the pixel 201 has a reset transistor 303 that is turned ON or OFF by the block 202 as a unit. A transfer transistor 302 of pixel 201 is also turned ON or OFF by the block 202 as a unit. In the example shown in FIG. 3, a reset wiring 300-1 is provided that is used to turn ON or OFF the four reset transistors 303 corresponding to the upper-left block 202-1. A TX wiring 307-1 is also provided that is used to supply a transfer pulse to the four transfer transistors 302 corresponding to the block 202-1.

Similarly, a reset wiring 300-3 is provided that is used to turn ON of OFF the four reset transistors 303 corresponding to the lower-left the block 202-3 so that the reset wiring 300-3 is provided separately from the reset wiring 300-1. A TX wiring 307-3 is provided that is used to supply a transfer pulse to the four transfer transistors 302 corresponding to the block 202-3 so that the TX wiring 307-3 is provided separately from the TX wiring 307-1.

An upper-right block 202-2 and a lower-right block 202-4 similarly have a reset wiring 300-2 and a TX wiring 307-2 as well as a reset wiring 300-4 and a TX wiring 307-4 that are provided in the respective blocks 202.

The 16 PDs 104 corresponding to each pixel 201 are connected to the corresponding transfer transistors 302, respectively. The gate of each transfer transistor 302 receives a transfer pulse supplied via the TX wiring of each block 202. The drain of each transfer transistor 302 is connected to the source of the corresponding reset transistor 303. A so-called floating diffusion FD between the drain of the transfer transistor 302 and the source of the reset transistor 303 is connected to the gate of the corresponding amplification transistor 304.

The drain of each reset transistor 303 is commonly connected to a Vdd wiring 310 to which a supply voltage is supplied. The gate of each reset transistor 303 receives a reset pulse supplied via the reset wiring of each block 202.

The drain of each amplification transistor 304 is commonly connected to the Vdd wiring 310 to which a supply voltage is supplied. The source of each amplification transistor 304 is connected to the drain of the corresponding the selection transistor 305. The gate of each the selection transistor 305 is connected to a decoder wiring 308 to which a selection pulse is supplied. The decoder wirings 308 are provided independently for 16 selection transistors 305, respectively.

The source of each selection transistor 305 is connected to a common output wiring 309. A load current source 311 supplies a current to an output wiring 309. Specifically, the output wiring 309 to the selection transistor 305 is formed by a source follower. It is noted that the load current source 311 may be provided at the imaging chip 113 side or may be provided at the signal processing chip 111 side.

The following section will describe the flow from the start of the accumulation of the electric charge to the pixel output after the completion of the accumulation. A reset pulse is applied to the reset transistor 303 through the reset wiring of each block 202 and a transfer pulse is simultaneously applied the transfer transistor 302 through the TX wiring of each block 202 (202-1 to 202-4). Then, the PD 104 and a potential of the floating diffusion FD are reset for each block 202.

When the application of the transfer pulse is cancelled, each PD 104 converts the received incident light to electric charge to accumulate the electric charge. Thereafter, when a transfer pulse is applied again while no reset pulse is being applied, the accumulated electric charge is transferred to the floating diffusion FD. The potential of the floating diffusion FD is used as a signal potential after the accumulation of the electric charge from the reset potential.

Then, when a selection pulse is applied to the selection transistor 305 through the decoder wiring 308, a variation of the signal potential of the floating diffusion FD is transmitted to the output wiring 309 via the amplification transistor 304 and the selection transistor 305. This allows the pixel signal corresponding to the reset potential and the signal potential to be outputted from the unit pixel to the output wiring 309.

As described above, the four pixels forming the block 202 have common reset wiring and TX wiring. Specifically, the reset pulse and the transfer pulse are simultaneously applied to the four pixels within the block 202, respectively. Thus, all pixels 201 forming a certain block 202 start the electric charge accumulation at the same timing and complete the electric charge accumulation at the same timing. However, a pixel signal corresponding to the accumulated electric charge is selectively outputted from the output wiring 309 by sequentially applying the selection pulse to the respective selection transistors 305.

In this manner, the timing at which the electric charge accumulation is started can be controlled for each block 202. In other words, images can be formed at different timings among different blocks 202.

Figure 4:
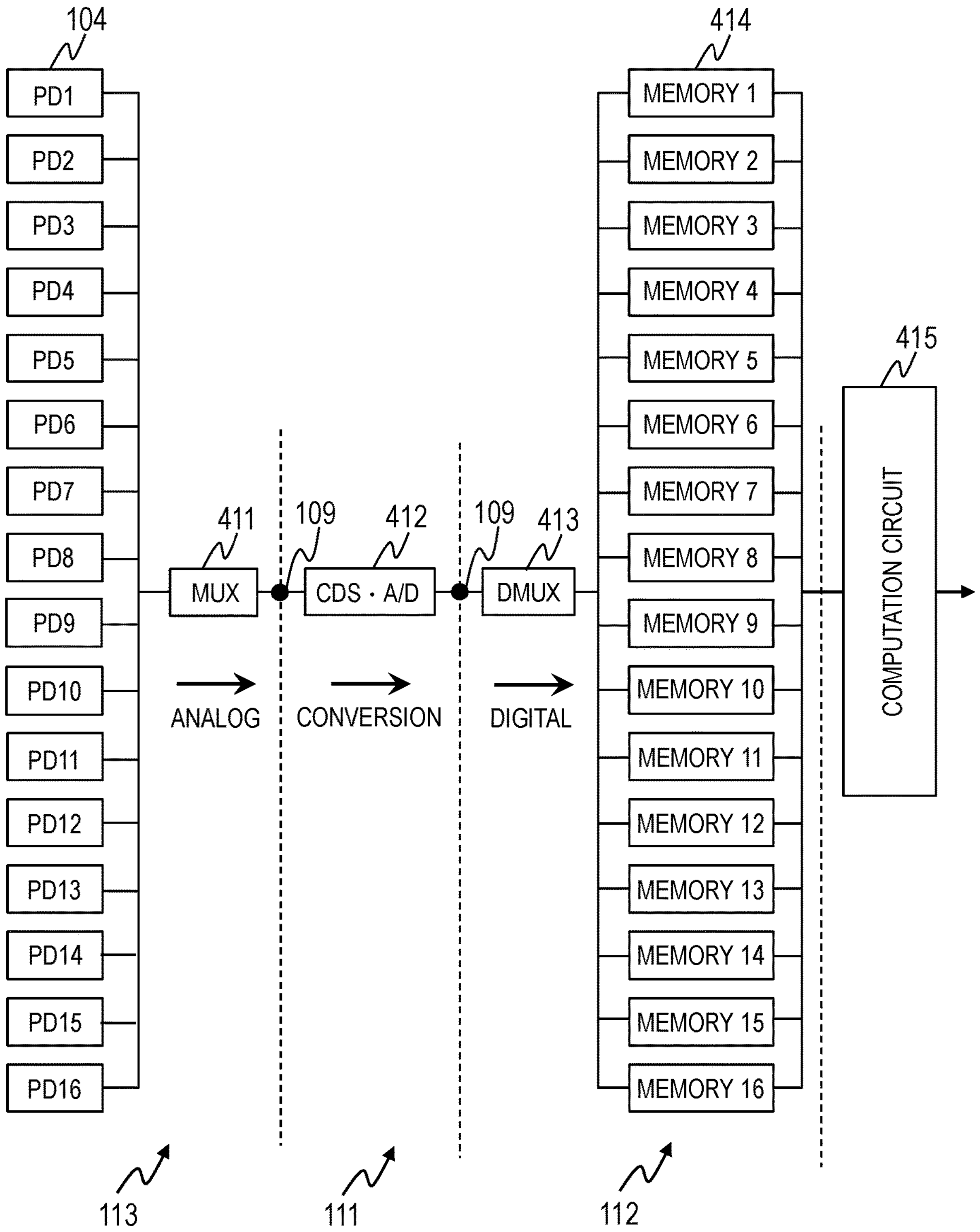
FIG. 4 is a block diagram illustrating an example of the functional configuration of the image capture element.

FIG. 4 is a block diagram illustrating an example of the functional configuration of the image capture element 100. An analog multiplexer 411 sequentially selects the sixteen PDs 104 forming the block 202 to output the respective pixel signals to the output wiring 309 provided to correspond to the block 202. The multiplexer 411 is formed in the imaging chip 113 together with the PDs 104.

The pixel signal outputted via the multiplexer 411 is subjected to the correlated double sampling (CDS) and the analog/digital (A/D) conversion performed by the signal processing circuit 412 formed in the signal processing chip 111. The A/D-converted pixel signal is sent to a demultiplexer 413 and is stored in a pixel memory 414 corresponding to the respective pixels. The demultiplexer 413 and the pixel memory 414 are formed in the memory chip 112.

A computation circuit 415 processes the pixel signal stored in the pixel memory 414 to send the result to the subsequent image processing unit. The computation circuit 415 may be provided in the signal processing chip 111 or may be provided in the memory chip 112. It is noted that FIG. 4 shows the connection of the four blocks 202 but they actually exist for each of the four blocks 202 and operate in a parallel manner.

However, the computation circuit 415 does not have to exist for each of the four blocks 202. For example, one computation circuit 415 may provide a sequential processing while sequentially referring to the values of the pixel memories 414 corresponding to the respective four blocks 202.

As described above, the output wirings 309 are provided to correspond to the respective blocks 202. The image capture element 100 is configured by layering the imaging chip 113, the signal processing chip 111, and the memory chip 112. Thus, these output wirings 309 can use the electrical connection among chips using the bump 109 to thereby providing a wiring arrangement without causing an increase of the respective chips in the face direction.

Block Configuration Example of Electronic Apparatus

Figure 5:
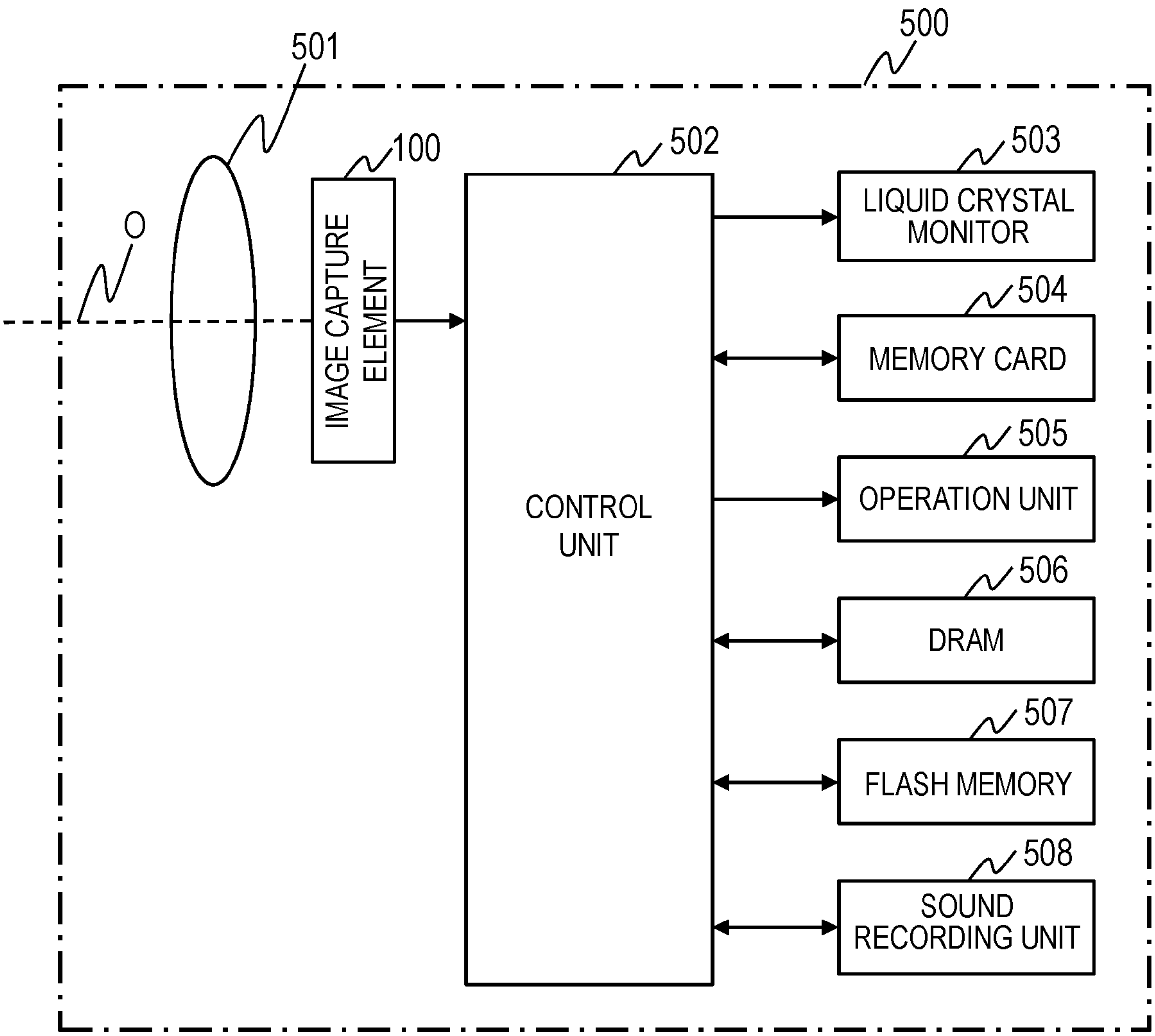
FIG. 5 illustrates the block configuration example of an electronic apparatus.

FIG. 5 illustrates the block configuration example of an electronic apparatus. An electronic apparatus 500 is a lens integrated-type camera for example. The electronic apparatus 500 includes an imaging optical system 501, an image capture element 100, a control unit 502, a liquid crystal monitor 503, a memory card 504, an operation unit 505, a DRAM 506, a flash memory 507, and a sound recording unit 508. The control unit 502 includes a compression unit for compressing video data as described later. Thus, a configuration in the electronic apparatus 500 that includes at least the control unit 502 functions as a video compression apparatus, a decompression apparatus or a playback apparatus. Furthermore, a memory card 504, a DRAM 506, and a flash memory 507 constitute a storage device 1202 described later.

The imaging optical system 501 is composed of a plurality of lenses and allows the imaging face 200 of the image capture element 100 to form a subject image. It is noted that FIG. 5 shows the imaging optical system 501 as one lens for convenience.

The image capture element 100 is an image capture element such as a CMOS (Complementary Metal Oxide Semiconductor) or a CCD (Charge Coupled Device) and images a subject image formed by the imaging optical system 501 to output an imaging signal. The control unit 502 is an electronic circuit to control the respective units of the electronic apparatus 500 and is composed of a processor and a surrounding circuit thereof.

The flash memory 507, which is a nonvolatile storage medium, includes a predetermined control program written therein in advance. A processor in the control unit 502 reads the control program from the flash memory 507 to execute the control program to thereby control the respective units. This control program uses, as a work area, the DRAM 506 functioning as a volatile storage medium.

The liquid crystal monitor 503 is a display apparatus using a liquid crystal panel. The control unit 502 allows, at a predetermined cycle (e.g., 60/1 seconds), the image capture element 100 to form a subject image repeatedly. Then, the imaging signal outputted from the image capture element 100 is subjected to various image processings to prepare a so-called through image to display the through image on the liquid crystal monitor 503. The liquid crystal monitor 503 displays, in addition to the above through image, a screen used to set imaging conditions for example.

The control unit 502 prepares, based on the imaging signal outputted from the image capture element 100, an image file (which will be described later) to record the image file on the memory card 504 functioning as a portable recording medium. The operation unit 505 has various operation units such as a push button. The operation unit 505 outputs, depending on the operation of these operation members, an operation signal to the control unit 502.

The sound recording unit 508 is composed of a microphone for example and converts the environmental sound to an acoustic signal to input the resultant signal to the control unit 502. It is noted that the control unit 502 may record a video file not in the memory card 504 functioning as a portable recording medium but in a recording medium (not shown) included in the electronic apparatus 500 such as a hard disk or a solid state drive (SSD).

FIGS. 1 to 5 depict sections in common with all of the embodiments described below. An image capture element and an image capture apparatus of each embodiment will be described below.

Embodiment 1

In Embodiment 1, the number of non-imaging regions in an optical black pixel region is greater than or equal to the number of imaging regions within an imaging pixel region, and a configuration is adopted in which the non-imaging region is disposed at a position differing from the imaging pixel region.

<Relationship Between Control Conditions for Imaging Pixel Region and Control Conditions for Optical Black Pixel Region>

Next, control conditions for the imaging pixel region, control conditions for the optical black pixel region, and the arrangement of the imaging pixel region and the optical black pixel region of Embodiment 1 will be described with reference to FIGS. 6, 10, and 11. Regarding FIGS. 10 and 11, the description will focus on differences from FIG. 6, and thus, description of sections that are in common with FIG. 6 will be omitted.

Figure 6:
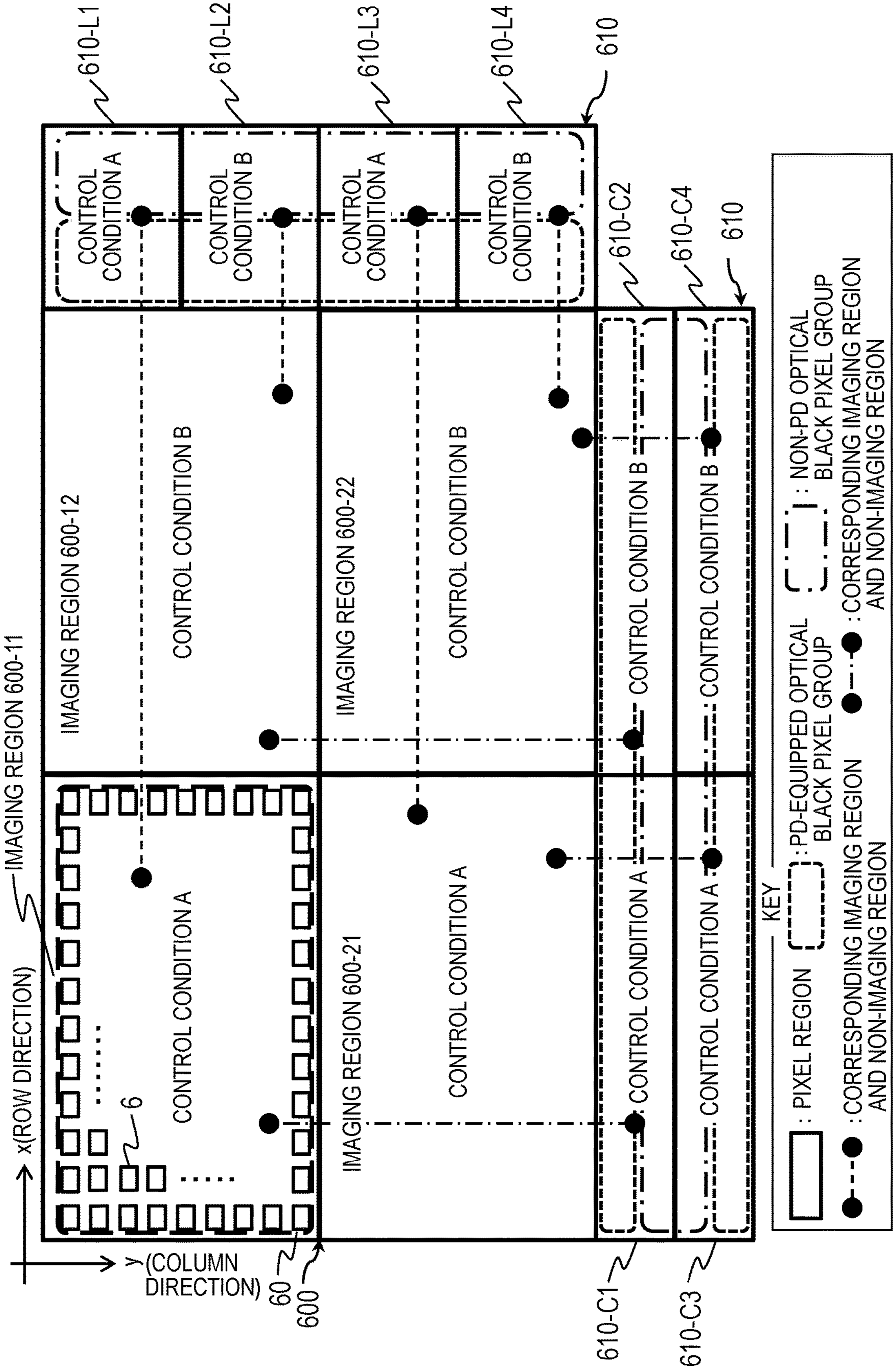
FIG. 6 is a descriptive view showing a relationship 1 between control conditions for the imaging pixel region and control conditions for the optical black pixel region according to Embodiment 1.

FIG. 6 is a descriptive view showing a relationship 1 between control conditions for the imaging pixel region and control conditions for the optical black pixel region according to Embodiment 1. In FIG. 6, the x direction is the row direction and the y direction is the column direction. The imaging face 200 shown in FIG. 2 has an imaging pixel region 600 and an optical black pixel region 610. Here, the imaging pixel region 600 is a region where imaging pixels 6 having a plurality of PDs 104 and the like that accumulate electric charge based on incident light are arranged in a two-dimensional manner. The optical black pixels have the same structure as the pixels arranged in the imaging pixel region, but are pixels where the PDs 104 are shielded from light. The optical black pixel regions 610 are regions in which optical black pixels are arranged one- or two-dimensionally, for example.

The imaging region is a group of one or more blocks 202, for example. In FIG. 6, for ease of explanation, the imaging pixel region 600 is constituted of two rows by two columns of imaging regions 600-11, 600-12, 600-21, and 600-22. However, the imaging pixel region 600 may be constituted of m rows by n columns (m and n are integers of one or greater; however, there are at least two imaging regions 600) other than two rows by two columns. If not distinguishing between the imaging regions 600-11, 600-12, 600-21, and 600-22, these are collectively referred to as the imaging regions 600-*ij*. Each imaging region 600-*ij* can be controlled under differing control conditions than other imaging regions 600-*ij*.

The optical black pixel regions 610 are constituted of a plurality of non-imaging regions 610-L1 to 610-L4 and 610-C1 to 610-C4 that do not perform imaging of subjects. Each of the non-imaging regions 610-L1 to 610-L4 and 610-C1 to 610-C4 comprise at least one of a non-PD optical black pixel group and a PD-equipped optical black pixel group to be described later, for example.

The non-PD optical black pixel group and the PD-equipped optical black pixel group of each of the non-imaging regions 610-L1 to 610-L4 and 610-C1 to 610-C4 have a configuration in which the pixels are arranged two-dimensionally in a similar manner to the block 202 described with reference to FIG. 3, for example. The non-PD optical black pixel group or the PD-equipped optical black pixel group has a configuration enabling control of the non-imaging regions 610-L1 to 610-L4 and 610-C1 to 610-C4 under respectively different control conditions.

In the embodiments, non-imaging regions provided with a non-PD optical black pixel group are also referred to as light-shielding pixel regions. The plurality of non-imaging regions 610-L1 to 610-L4 constitute a non-imaging region group arranged in the column direction. If not distinguishing among the non-imaging region group arranged in the column direction, the non-imaging regions are referred to as the non-imaging regions 610-Lp. The plurality of non-imaging regions 610-C1 to 610-C4 constitute a non-imaging region group arranged in the row direction.

If not distinguishing among the non-imaging region group arranged in the row direction, the non-imaging regions are referred to as the non-imaging regions 610-Cq. If not distinguishing between the plurality of non-imaging regions 610-L1 to 610-L4 and 610-C1 to 610-C4, these are referred to as the non-imaging regions 610-*pq*. One non-imaging region 610-*pq* includes the PD-equipped optical black pixel group and the non-PD optical black pixel group.

The optical black pixel regions 610 are adjacent to the outside of the imaging pixel region 600. In the example of FIG. 6, the optical black pixel regions 610 are provided on the right edge and the bottom edge of the imaging pixel region 600. The positions at which the optical black pixel regions 610 are arranged may be at least one of the top edge, the bottom edge, the right edge, and the left edge of the imaging pixel region 600.

The optical black pixel regions 610 have the PD-equipped optical black pixel group and the non-PD optical black pixel group. The PD-equipped optical black pixel group is a group of optical black pixels equipped with PDs. The PD-equipped optical black pixels are black pixels having the PDs 104. Specifically, for example, the PD-equipped optical black pixels are pixels having a light-shielding layer that blocks incident subject light.

The non-PD optical black pixel group is a group of optical black pixels not equipped with PDs. The non-PD optical black pixels are black pixels that do not have PDs 104. The output from the PD-equipped optical black pixels or the output signal from the non-PD optical black pixels are subtracted from the output signal from the imaging pixels, thereby executing black level correction and eliminating noise such as a dark current component.

Also, the number of non-imaging regions 610-*pq* is greater than or equal to the number of imaging regions 600-*ij*. In FIG. 6, the number of non-imaging regions 610-*pq* is eight and the number of imaging regions 600-*ij* is four.

Also, the non-imaging regions 610-Cq are arranged in two rows by two columns. The non-imaging regions 610-C1 and 610-C3 are arranged in the column direction, and the non-PD optical black pixel group of the non-imaging region 610-C1 is adjacent to the non-PD optical black pixel group of the non-imaging region 610-C3. Similarly, the non-imaging regions 610-C2 and 610-C4 are arranged in the column direction, and the non-PD optical black pixel group of the non-imaging region 610-C2 is adjacent to the non-PD optical black pixel group of the non-imaging region 610-C4. In this manner, the non-PD optical black pixel groups of the non-imaging region 610-Cq are not separated, and thus, it is possible to reduce the number of non-PD optical black pixel groups disposed and therefore reduce the manufacturing cost.

<Circuit Configuration of Imaging Pixel Region 600 and Optical Black Pixel Region 610>

Figure 7:
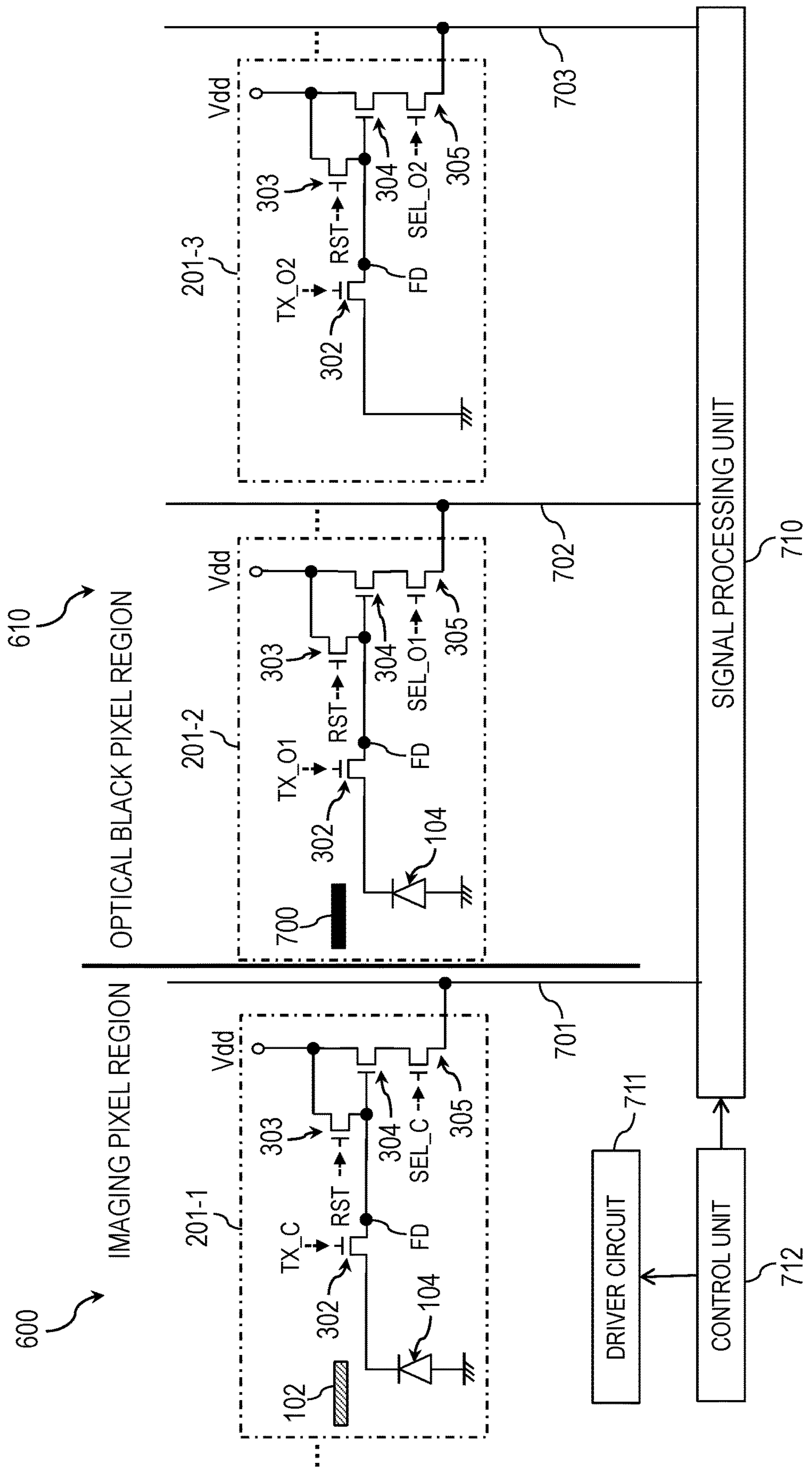
FIG. 7 is a circuit diagram showing the circuit configuration of the imaging pixel region and the optical black pixel region in the row direction according to Embodiment 1.
Figure 8:
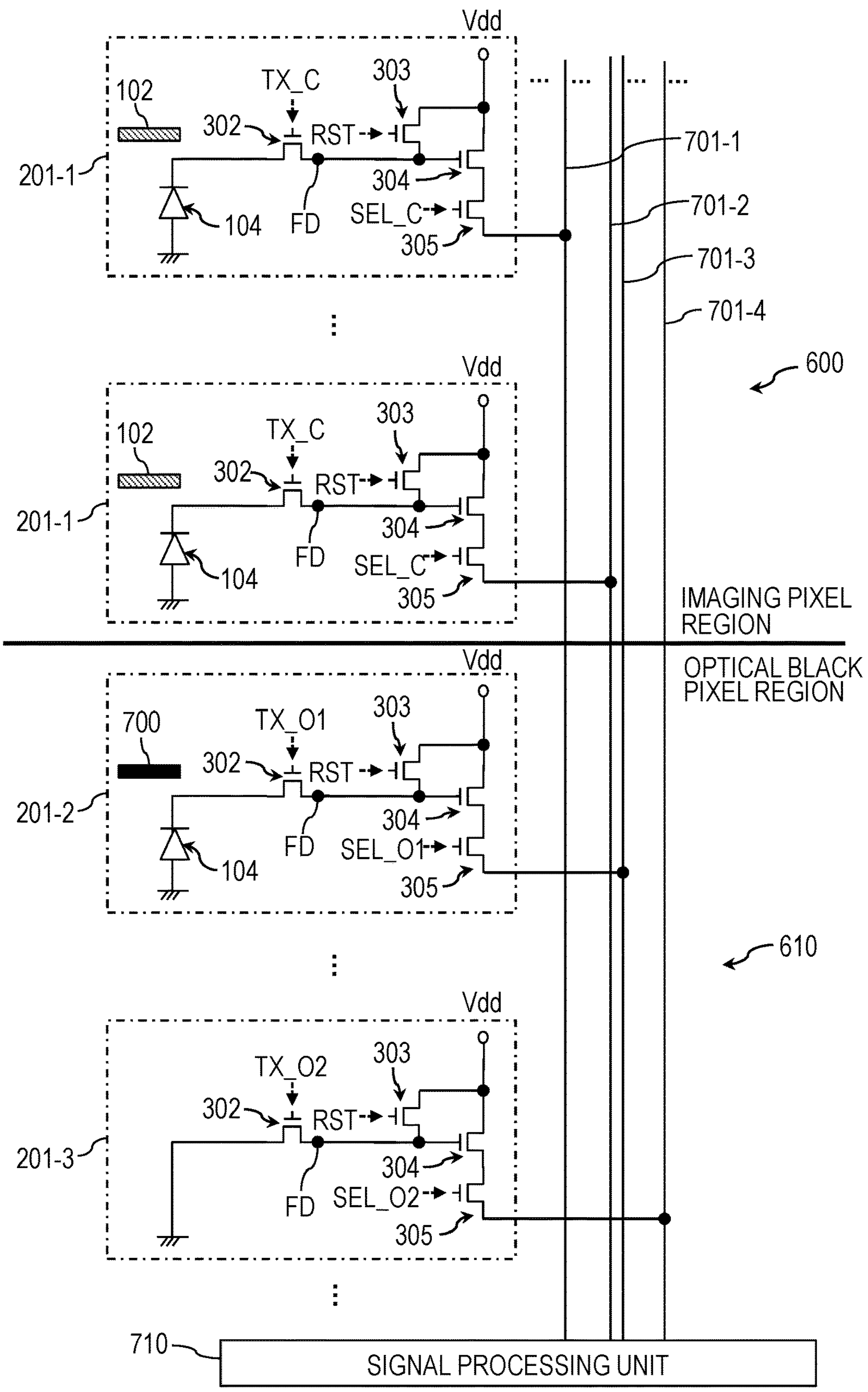
FIG. 8 is a circuit diagram showing a circuit configuration of the imaging pixel region and the optical black pixel region in the column direction according to Embodiment 1.

FIG. 7 is a circuit diagram showing the circuit configuration of the imaging pixel region 600 and the optical black pixel region 610 in the row direction according to Embodiment 1. FIG. 8 is a circuit diagram showing a circuit configuration of the imaging pixel region 600 and the optical black pixel region 610 in the column direction according to Embodiment 1. In FIGS. 7 and 8, the pixels 201 in the imaging pixel region 600 are imaging pixels 201-1, and the pixels 201 in the optical black pixel region 610 are PD-equipped optical black pixels 201-2 and non-PD optical black pixels 201-3.

The pixels 201 have a transfer transistor 302, a reset transistor 303, an amplification transistor 304, a selection transistor 305, and a floating diffusion FD. The imaging pixels 201-1 additionally have a red (R), green (G), or blue (B) color filter 102 and the PD 104. The PD-equipped optical black pixels 201-2 additionally have a light-shielding layer 700 and the PD 104. The non-PD optical black pixels 201-3 have neither the filter nor the PD 104.

The imaging pixels 201-1 generate an electric charge according to the quantity of light incident on the color filter 102. Meanwhile, the PD-equipped optical black pixels 201-2 have the light-shielding layer 700, and thus, do not generate an electric charge according to the quantity of incident light, but generate an electric charge corresponding to thermal noise.

The transfer transistor 302 of each of the imaging pixels 201-1 and the PD-equipped optical black pixels 201-2, upon having a control signal TX_C or TX_O1 applied to the gate thereof from a driver circuit 711, transfers the electric charge accumulated in the PD 104 to the floating diffusion FD. The transfer transistor 302 of the non-PD optical black pixels 201-3 does not generate an electric charge originating in the PD 104 even when the gate thereof has applied thereto a control signal TX_O2 from the driver circuit 711.

The reset transistor 303, upon having a control signal RST applied to the gate thereof from the driver circuit 711, sets the potential of the floating diffusion FD to substantially the same as Vdd. The reset transistor 303 eliminates electrons accumulated in the floating diffusion FD, for example.

The selection transistor 305, upon having a control signal SEL_C, SEL_O1, or SEL_O2 applied to the gate thereof from the driver circuit 711, outputs a current at a voltage amplified by the amplification transistor 304 to column read lines 701 to 703. Column read lines 701-1 to 701-4 of FIG. 8 correspond to the column read line 701 of FIG. 7.

A pixel signal corresponding to the electric charge generated by the PD 104 is outputted from the column read line 701. A signal based on the voltage level corresponding to thermal noise is outputted from the column read line 702. A signal corresponding to the black level serving as a reference is outputted from the column read line 703. The column read lines 701 to 703 are connected to a signal processing unit 710 via a CDS circuit, an A/D converter circuit, and the like, which are not shown.

The signal processing unit 710 receives as input a signal corresponding to the electric charge quantity resulting from photoelectric conversion at the imaging pixels 201-1. The signal processing unit 710 receives as input a signal corresponding to the thermal noise detected in the PD-equipped optical black pixels 201-2. The signal processing unit 710 uses the signal from the non-PD optical black pixels 201-3 as a reference for the black level of the imaging pixels 201-1.

The signal processing unit 710 subtracts, from the output signal from the imaging pixels 201-1, the output signal from the PD-equipped optical black pixels 201-2 or the output signal from the non-PD optical black pixels 201-3 to execute black level correction. As a result, noise such as dark current is eliminated. The signal processing unit 710 may be realized by a circuit or may be realized by a processor executing a program stored in a memory.

The driver circuit 711 (not shown in FIG. 8) supplies the control signals TX, RST, and SEL, serving as signal pulses to the respective gates of the transfer transistor 302, the reset transistor 303, and the selection transistor 305. As a result, the transfer transistor 302, the reset transistor 303, and the selection transistor 305 are turned ON.

The control unit 712 (not shown in FIG. 8) controls the driver circuit 711. The control unit 712 controls the transfer transistor 302, the reset transistor 303, and the selection transistor 305 by controlling the timing of the pulse to the respective gates of the transfer transistor 302, the reset transistor 303, and the selection transistor 305. Also, the control unit 712 controls the operation of the signal processing unit 710.

<Timing Chart Indicating Operation of Blocks 202>

Figure 9:
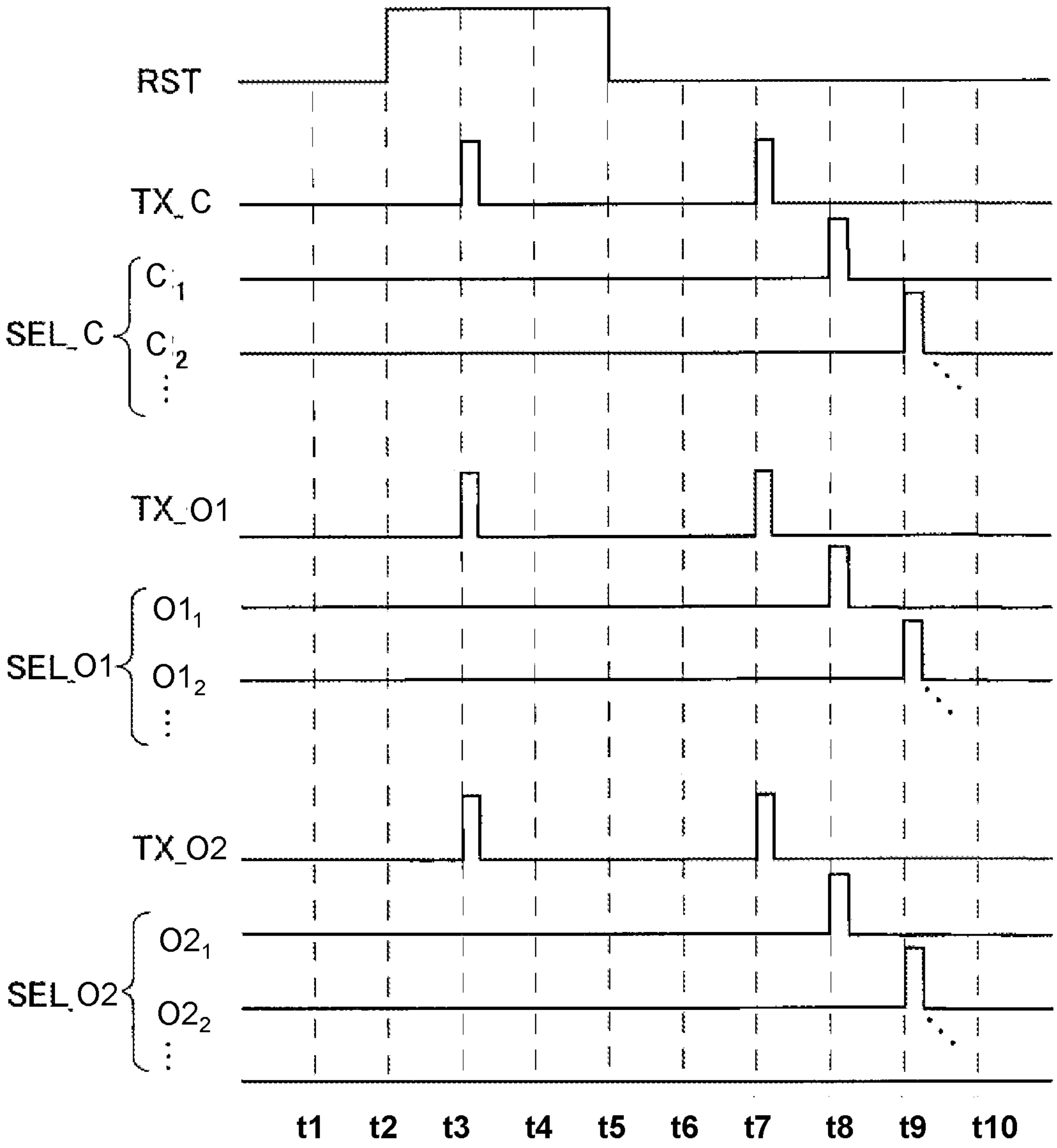
FIG. 9 is a timing chart showing the operation of the blocks of Embodiment 1.

FIG. 9 is a timing chart showing the operation of the blocks 202 of Embodiment 1. The driver circuit 711 controls the transfer transistor 302 and the reset transistor 303 at the same timing in one block 202. However, for pixels 201 provided with color filters 102 with the same spectral characteristics, the driver circuit 711 outputs the pixel signal from the selection transistor 305 at a timing offset for each pixel 201.

The driver circuit 711 turns ON each reset transistor 303 (RST) of the one block 202 at a time t2, for example. As a result, the potential of the gate of each amplification transistor 304 is reset. The driver circuit 711 maintains each reset transistor 303 (RST) in the ON state from the time t2 to a time t5.

The driver circuit 711 turns ON all of the transfer transistors 302 in the one block 202 at a time t3. As a result, first the electric charge accumulated in the PDs 104 present in the block 202 is reset.

The driver circuit 711 turns OFF each reset transistor 303 (RST) at the time t5. Then, the driver circuit 711 again turns ON all of the transfer transistors 302 in the one block 202 at a time t7. As a result, the electric charge accumulated in the PDs 104 present in the one block 202 is transferred to each corresponding floating diffusion FD.

During the period from the time t3 to the time t7, the pixels 201 having the PDs 104 in the one block 202 accumulate electric charge. That is, the period from the time t3 to the time t7 is an electric charge accumulation period for the pixels 201 having the PDs 104.

The driver circuit 711 sequentially turns ON the transfer transistors 302 from a time t8 onward. In this example, during the time t8, the electric charge accumulated in the PDs 104 of the one block 202 is transferred to the column read lines 701 to 703, respectively.

Also, during the time t9, the electric charge accumulated in the PDs 104 of another block 202 is transferred to the column read lines 701 to 703, respectively. The transfer operation is executed for each pixel 201 within the one block 202. As a result, the pixel signal of each pixel 201 included in the one block 202 is outputted to the column read lines 701 to 703, respectively.

Returning to FIG. 6, the positional relationship between the imaging regions 600-*ij* and the non-imaging regions 610-*pq* will be described. As previously described, each imaging region 600-*ij* has a configuration in which imaging pixels 6 are arranged two-dimensionally. The imaging pixels 6 of each imaging region 600-*ij* have a similar configuration to the block 202 described with reference to FIG. 2, and can be controlled under differing control conditions for the respective imaging regions 600-*ij*, for example.

Here, a closed region 60 including all imaging pixels 6, included in the imaging regions 600-*ij*, that are connected to control lines (e.g., TX wiring 307) provided in each imaging region 600-*ij*, and set such that the outer edges are at the minimum length, is considered. The non-imaging regions 610-*pq* are positioned to the outside of the closed region 60. Through this configuration, it is possible to uniformly arrange the imaging pixels 6 on the inside of each imaging region 600-*ij*. Thus, it is possible to ensure a high quality image generated by the imaging pixels 6 of each imaging region 600-*ij* without the occurrence of so-called defective pixels.

Next, control conditions and black level correction set for the imaging pixel region 600 and the optical black pixel regions 610 will be described. A control condition is set for each imaging region 600-*ij*. A control condition A is set for the imaging regions 600-11 and 600-21 and a control condition B is set for the imaging regions 600-12 and 600-22, for example. Similarly, the control condition A is set for the non-imaging regions 610-L1, 610-L3, 610-C1, and 610-C3 and the control condition B is set for the non-imaging regions 610-L2, 610-L4, 610-C2, and 610-C4, for example.

The control conditions A and B differ from each other. Specifically, if the control condition A is the exposure time and the control condition B is the ISO speed, for example, then the control conditions A and B differ in type. Also, if the control condition A is an exposure time of ¼ second and the control condition B is an exposure time of 1/250 second, for example, then the control conditions A and B are differing conditions but of the same type.

The dotted lines having a black circle dot on each end indicate that the imaging region 600-*ij* and the non-imaging region 610-*pq* where the black circle dots are present in the row direction have corresponding black level correction. The imaging region 600-*ij* where the black circle dot is located is referred to as a "reference origin imaging region 600-*ij*" for black level correction and the non-imaging region 610-*pq* where the black circle dot is located is referred to as a "reference destination non-imaging region 610-*pq*" for black level correction (similarly applies to one-dot-chain lines with black circle dots on both ends to be mentioned later).

A pixel group arranged in the row direction is selected at the same timing for each row selection circuit or block 202, and outputs a pixel signal. Thus, the reference origin imaging region 600-*ij* and the reference destination non-imaging region 610-*pq* are considered to have a correlation with regard to the dark current or the like. Thus, if the output signal from the reference origin imaging region 600-*ij* is subjected to black level correction, then by subtracting the output signal coming from the reference origin imaging region 600-*ij* using the output signal of the reference destination non-imaging region 610-*pq*, it is possible to perform high accuracy black level correction based on the reference origin imaging region 600-*ij*.

Also, the one-dot-chain lines having a black circle dot on each end indicate that the imaging region 600-*ij* and the non-imaging region 610-*pq* where the black circle dots are present in the column direction have corresponding black level correction. The pixel group arrayed in the column direction is connected to the same column read line and outputs respective analog signals, which are converted by the same A/D converter to digital signals.

Thus, the reference origin imaging region 600-*ij* and the reference destination non-imaging region 610-*pq* are considered to have a correlation with regard to the dark current or the like. Therefore, if the output signal from the reference origin imaging region 600-*ij* is subjected to black level correction, then by subtracting the output signal coming from the reference origin imaging region 600-*ij* using the output signal from the reference destination non-imaging region 610-*pq*, it is possible to perform high accuracy black level correction based on the reference origin imaging region 600-*ij*.

As described above, the number of non-imaging regions 610-*pq* is greater than or equal to the number of imaging regions 600-*ij*. Thus, one imaging region 600-*ij* can be associated with one or more non-imaging regions 610-*pq* in performing black level correction. In black level correction, whether to use the output signal of row direction or column direction non-imaging regions 610-*pq* for the imaging regions 600-*ij* may be set in advance, and may be set according to the control conditions of the respective imaging regions 600-*ij* and the respective non-imaging regions 610-*pq*. Alternatively, among the output signals of the row direction and column direction non-imaging regions 610-*pq*, the larger value, the smaller value, or an average value may be used for the imaging regions 600-*ij*.

Also, in the example described above, the "reference origin imaging region 600-*ij*" and the "reference destination non-imaging region 610-*pq*" are selected at the same time for each row selection circuit or block 202, or analog signals are converted to digital signals by the same A/D converter, but the configuration is not limited thereto. For example, a configuration may be adopted in which the "reference origin imaging region 600-*ij*" and the "reference destination non-imaging region 610-*pq*" are not selected at the same time for each row selection circuit or block 202 and analog signals are not converted to digital signals by the same A/D converter.

Even in the case of this configuration, as a result of the "reference origin imaging region 600-*ij*" and the "reference destination non-imaging region 610-*pq*" being controlled under the same control condition, a correlation occurs between the dark currents and the like of the "reference origin imaging region 600-*ij*" and the "reference destination non-imaging region 610-*pq*," and thus, by subtracting the output signal coming from the reference origin imaging region 600-*ij* using the output signal coming from the reference destination non-imaging region 610-*pq*, it is possible to perform high accuracy black level correction based on the reference origin imaging region 600-*ij*.

Figure 10:
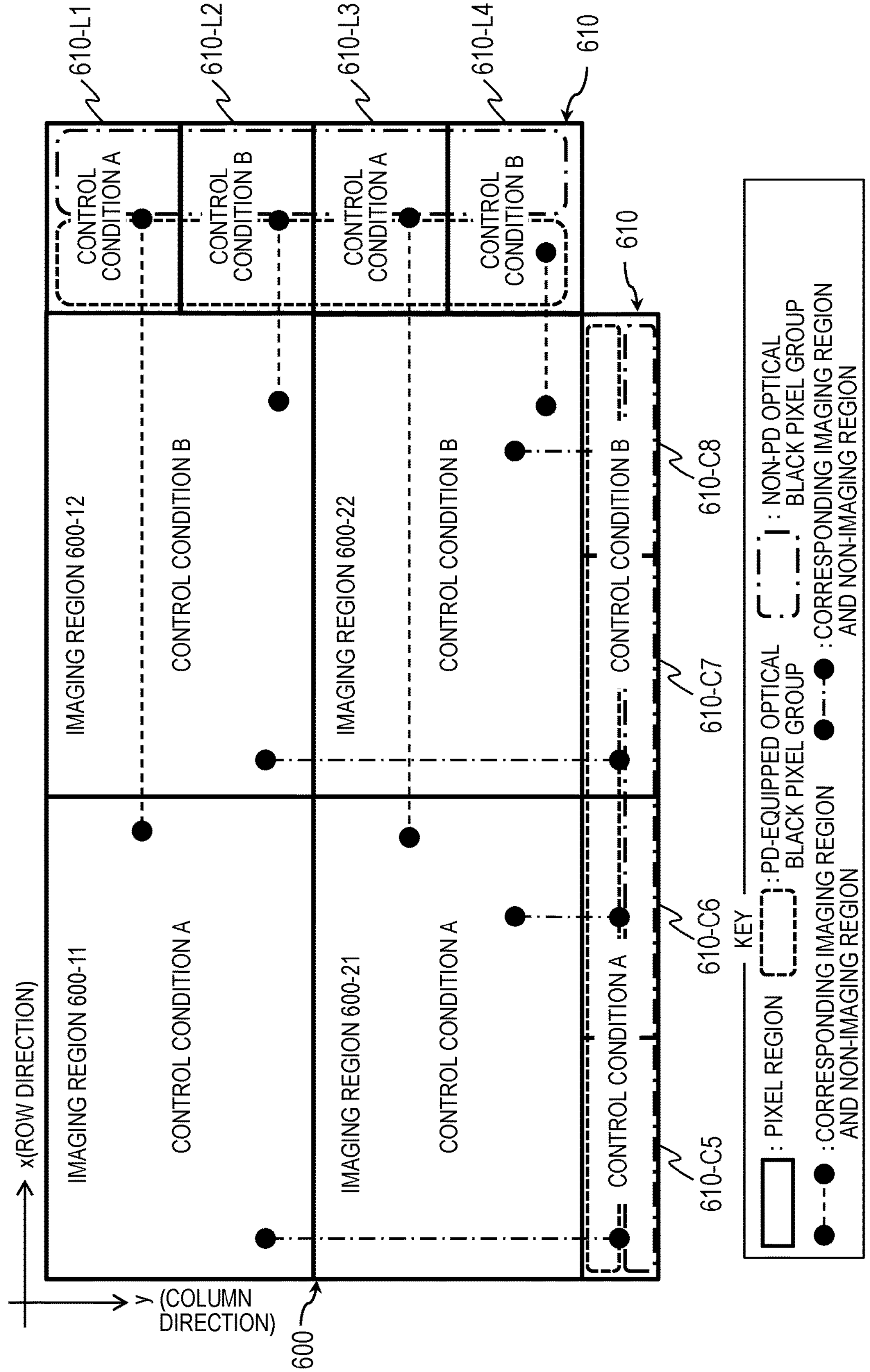
FIG. 10 is a descriptive view showing a relationship 2 between control conditions for the imaging pixel region and control conditions for the optical black pixel region according to Embodiment 1.

FIG. 10 is a descriptive view showing a relationship 2 between control conditions for the imaging pixel region and control conditions for the optical black pixel region according to Embodiment 1. FIG. 10, like FIG. 6, is also an example in which the number of non-imaging regions 610 is greater than or equal to the number of imaging regions 600. In FIG. 10, a configuration is shown in which the non-imaging regions 610-C5, 610-C6, 610-C7, and 610-C8 are arrayed in the row direction instead of the non-imaging regions 610-C1, 610-C2, 610-C3, and 610-C4 shown in FIG. 6.

The control condition A is set for the non-imaging regions 610-C5 and 610-C6 and the control condition B is set for the non-imaging regions 610-C7 and 610-C8. The relationship between the reference origin imaging region 600-*ij* and the reference destination non-imaging region 610-*pq* is as indicated with the dotted lines with the black circle dots on both ends and the one-dot-chain lines with the black circle dots on both ends, similar to FIG. 6. The non-imaging regions 610-C5, 610-C6, 610-C7, and 610-C8 are arrayed in only one row in the row direction, and thus, the area of the imaging pixel region 600 can be set to be larger than in FIG. 6.

Figure 11:
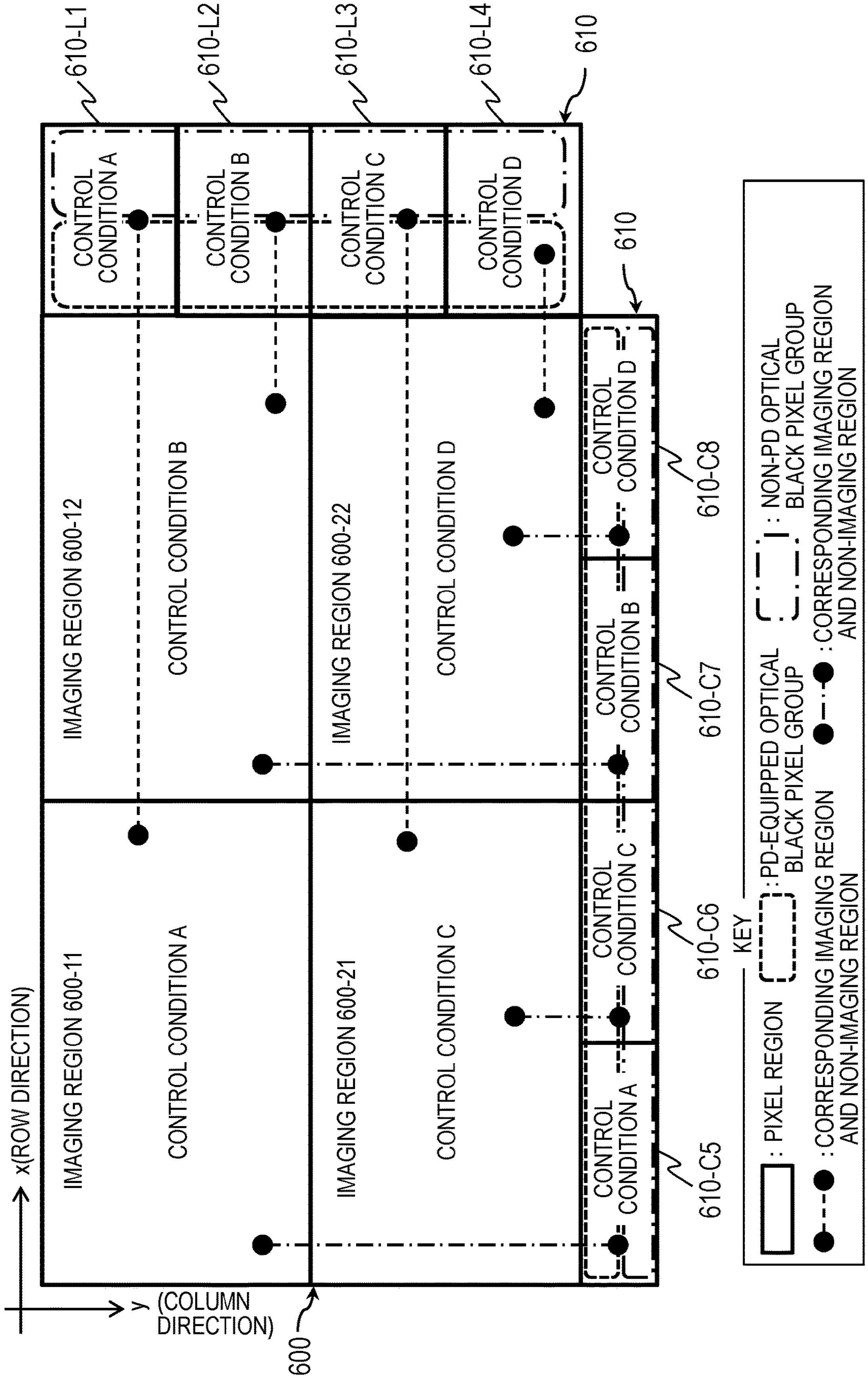
FIG. 11 is a descriptive view showing a relationship 3 between control conditions for the imaging pixel region and control conditions for the optical black pixel region according to Embodiment 1.

FIG. 11 is a descriptive view showing a relationship 3 between control conditions for the imaging pixel region and control conditions for the optical black pixel region according to Embodiment 1. FIG. 11, like FIG. 6, is also an example in which the number of non-imaging regions 610 is greater than or equal to the number of imaging regions 600. In FIG. 11, the control condition A is set for the imaging region 600-11, the control condition B is set for the imaging region 600-12, a control condition C is set for the imaging region 600-21, and a control condition D is set for the imaging region 600-22.

Also, in FIG. 11, a configuration is shown in which the non-imaging regions 610-C5, 610-C6, 610-C7, and 610-C8 are arrayed in the row direction instead of the non-imaging regions 610-C1, 610-C2, 610-C3, and 610-C4 shown in FIG. 6. The control condition A is set for the non-imaging region 610-C5, the control condition C is set for the non-imaging region 610-L6, the control condition B is set for the non-imaging region 610-C5, and the control condition D is set for the non-imaging region 610-C8.

Also, the control condition A is set for the non-imaging region 610-L1, the control condition B is set for the non-imaging region 610-L2, the control condition C is set for the non-imaging region 610-L3, and the control condition D is set for the non-imaging region 610-L4.

The control conditions A to D differ from each other. Also, the relationship between the reference origin imaging region 600-*ij* and the reference destination non-imaging region 610-*pq* is as indicated with the dotted lines with the black circle dots on both ends and the one-dot-chain lines with the black circle dots on both ends, similar to FIG. 6.

The non-imaging regions 610-C5, 610-C6, 610-C7, and 610-C8 are arrayed in only one row in the row direction, and thus, the area of the imaging pixel region 600 can be set to be larger than in FIG. 6. Also, the number of differing control conditions that can be set is limited to the number of imaging regions at maximum. In FIGS. 6, 10, and 11, the number of imaging regions 600 is four in all cases, but in FIGS. 6 and 10, the number of different control conditions is two: A and B.

By contrast, in FIG. 11, the number of different control conditions is four: A to D. In this manner, it is possible to set the number of control conditions in proportion to the number of imaging regions 600. Thus, it is possible to combine various control conditions and improve the flexibility in performing image capture.

Another Example of PD-Equipped Optical Black Pixel 201-2

Figure 12:
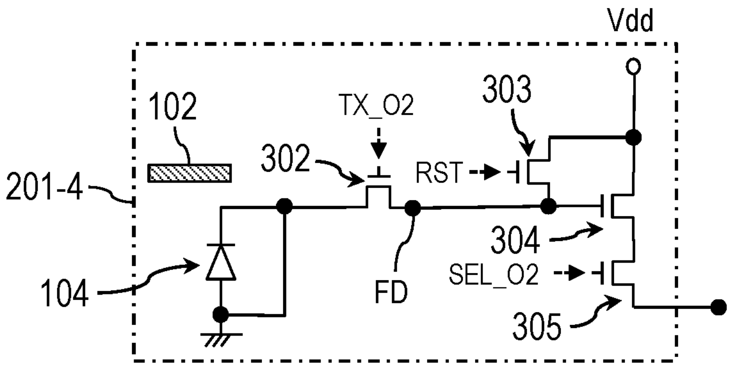
FIG. 12 is a block diagram showing another example of the PD-equipped optical black pixel according to Embodiment 1.

FIG. 12 is a block diagram showing another example of the PD-equipped optical black pixel 201-2 according to Embodiment 1. In the PD-equipped optical black pixel 201-4, the output of the PD 104 is connected to the PD 104. Other than the junction between the PD 104 and the transfer transistor 302 being shorted to ground, this configuration is similar to that of FIGS. 7 and 8.

Thus, an electric charge resulting from photoelectric conversion essentially does not accumulate in the PD 104. Even if an electric charge were to accumulate in the PD 104, the electric charge would not be read as a pixel signal, but an electric charge resulting from a dark current or the like would accumulate in the floating diffusion FD.

As described above, according to Embodiment 1, it is possible to execute black level correction using the non-imaging region 610-*pq* outside of the correlated imaging pixel region 600 for each of the imaging regions 600-*ij* of the imaging pixel region 600. Thus, it is possible to increase the accuracy of black level correction of each of the imaging regions 600-*ij*.

Also, a closed region 60 including all imaging pixels 6, included in the imaging region 600-*ij*, that are connected to control lines (e.g., TX wiring 307) provided in each imaging region 600-*ij*, and set such that the outer edges are at the minimum length, is considered. The non-imaging regions 610-*pq* are positioned to the outside of the closed region 60. As a result, it is possible to uniformly arrange the imaging pixels 6 on the inside of each imaging region 600-*ij*. Thus, it is possible to ensure a high quality image generated by the imaging pixels 6 of each imaging region 600-*ij* without the occurrence of so-called defective pixels.

Embodiment 2

In Embodiment 2, the number of non-imaging regions in an optical black pixel region to be described later is less than the number of imaging regions within an imaging pixel region. The same components as Embodiment 1 are assigned the same reference characters and descriptions thereof are omitted.

<Relationship Between Control Conditions for Imaging Pixel Region and Control Conditions for Optical Black Pixel Region>

Figure 13:
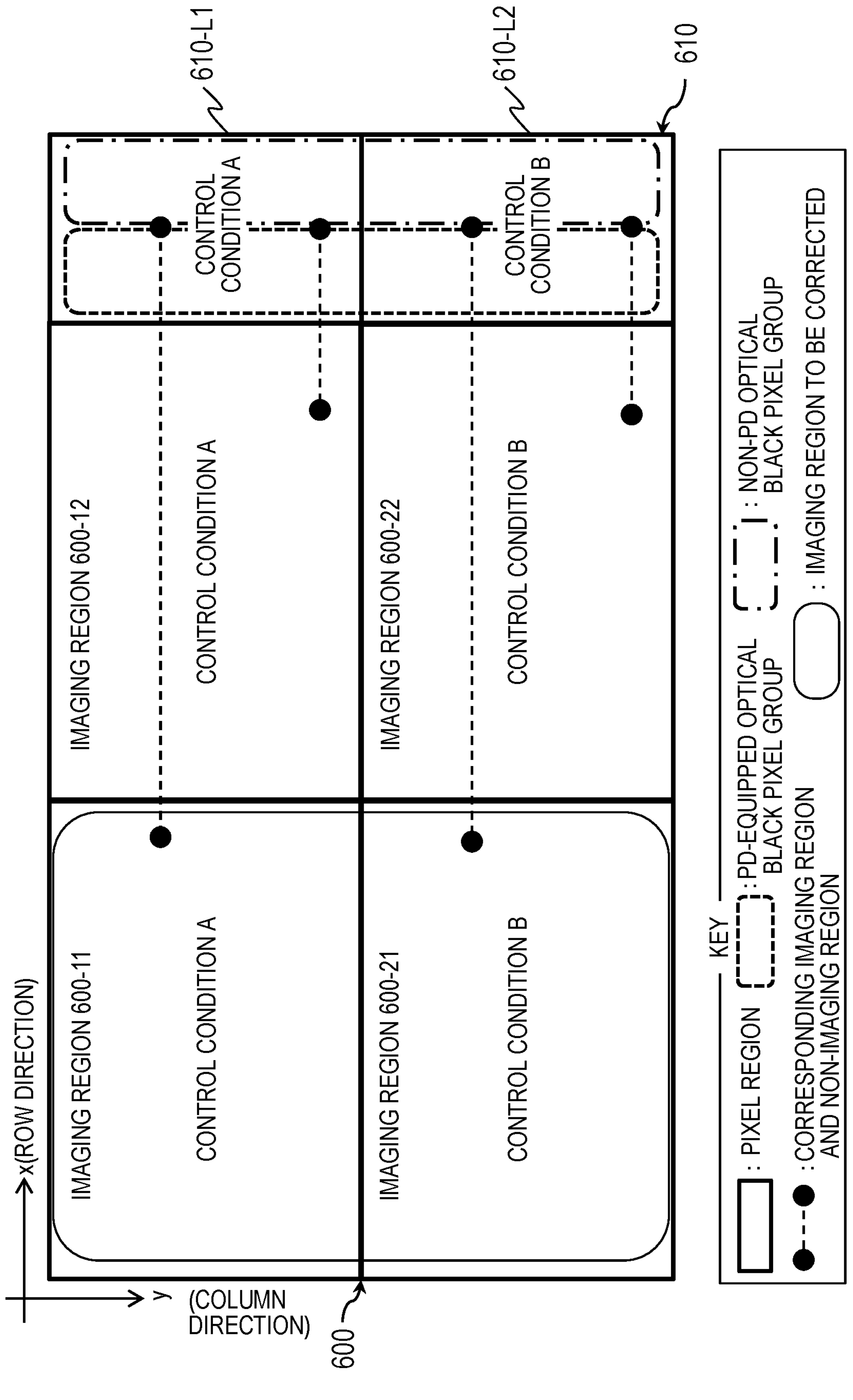
FIG. 13 is a descriptive view showing a relationship between control conditions for the imaging pixel region and control conditions for the optical black pixel region according to Embodiment 2.

FIG. 13 is a descriptive view showing a relationship between control conditions for the imaging pixel region 600 and control conditions for the optical black pixel region according to Embodiment 2. The optical black pixel region 610 is constituted of a plurality of non-imaging regions 610-L1 and 610-L2 that do not perform imaging of subjects. The plurality of non-imaging regions 610-L1 and 610-L2 constitute a non-imaging region group arranged in the column direction. If not distinguishing among the non-imaging region group, the non-imaging regions are referred to as the non-imaging regions 610-Lp.

The optical black pixel region 610 is adjacent to the outside of the imaging pixel region 600. In the example of FIG. 13, the optical black pixel region is provided on the right edge of the imaging pixel region 600. The position at which the optical black pixel region 610 is arranged may be at least one of the right edge and the left edge of the imaging pixel region 600. Also, the number of non-imaging regions 610-Lp is less than the number of imaging regions 600-*ij*. In FIG. 13, the number of non-imaging regions 610-Lp is two and the number of imaging regions 600-*ij* is four.

Next, control conditions set for the imaging pixel region 600 and the optical black pixel region 610 will be described. A control condition is set for each imaging region 600-*ij*. A control condition A is set for the imaging regions 600-11 and 600-12 and a control condition B is set for the imaging regions 600-21 and 600-22, for example. Similarly, the control condition A is set for the non-imaging region 610-L1 and the control condition B is set for the non-imaging region 610-L2.

Similar to FIG. 6, the dotted lines having a black circle dot on each end indicate that the imaging region 600-*ij* and the non-imaging region 610-*pq* where the black circle dots are present in the row direction have corresponding black level correction. The imaging region 600-*ij* where the black circle dot is located is referred to as a "reference origin imaging region 600-*ij*" for black level correction and the non-imaging region 610-*pq* where the black circle dot is located is referred to as a "reference destination non-imaging region 610-*pq*" for black level correction (similarly applies to one-dot-chain lines with black circle dots on both ends to be mentioned later).

A pixel group arranged in the row direction is selected at the same timing for each row selection circuit or block 202, and outputs a pixel signal. Thus, the reference origin imaging region 600-*ij* and the reference destination non-imaging region 610-Lp are considered to have a correlation with regard to the dark current or the like. Therefore, if the output signal from the reference origin imaging region 600-*ij* is subjected to black level correction, then by subtracting the output signal coming from the reference origin imaging region 600-*ij* using the output signal coming from the reference destination non-imaging region 610-Lp, it is possible to perform black level correction based on the reference origin imaging region 600-*ij*.

As described above, the number of non-imaging regions 610-Lp is less than the number of imaging regions 600-*ij*. Thus, one imaging region 600-*ij* can be associated with one or more non-imaging regions 610-Lp in performing black level correction. Also, the black level correction was executed for each row, but may be executed for each region. That is, each signal level of the imaging region 600-11 may be corrected according to a value attained by averaging the outputs of the signals from the non-imaging region 610-L1.

<Correction Table>

FIG. 14 is a descriptive drawing showing an example of a correction table according to Embodiment 2. A correction table 1400 is a table in which a correlation value 1405 is set for each combination of a reference origin imaging region 1401, a reference origin control condition 1402, a reference destination non-imaging region 1403, and a reference destination control condition 1404. The reference origin imaging region 1401 stores the reference origin imaging region 600-*ij* as a value. The reference origin control condition 1402 stores the control condition of the reference origin imaging region 600-*ij* as a value. The reference destination non-imaging region 1403 stores the non-imaging region 610-Lp serving as the reference destination of the reference origin imaging region 600-*ij* as a value. The reference destination control condition 1404 stores the control condition of the non-imaging region 610-Lp as a value.

The correlation value 1405 stores a value (correlation value r(ijX, LpY); X is the reference origin control condition 1402 and Y is the reference destination control condition 1404) indicating the correlation between the reference origin imaging region 1401 for which the reference origin control condition 1402 was set and the reference destination non-imaging region 1403 for which the reference destination control condition 1404 was set.

The correlation value r(ijX, LpY) is sometimes simply referred to as the correlation value r. In the case of the correlation value r, a value closer to 1.0 indicates a greater correlation between the reference origin imaging region 1401 and the reference destination non-imaging region 1403, and values further from 1.0 indicate a lower correlation between the reference origin imaging region 1401 and the reference destination non-imaging region 1403.

Here, the output from the PD-equipped optical black pixel or the output from the non-PD optical black pixel is Q and the noise component after correction is Pin the reference destination non-imaging region 610-Lp. The relationship between P and Q is represented by the following formula (1).

$$P = r \times Q + b \quad (1)$$

b is an adjustment value to be set to any given value, and is a value determined for each image capture element 100. The calculation using formula (1) is executed by a signal processing unit 810 to be mentioned later, for example.

If the reference origin imaging region 1401 and the reference destination non-imaging region 1403 are in the same row, then the correlation value r has a tendency of being close to 1.0. In FIG. 13, for example, if the reference origin imaging region 1401 is the imaging region 600-11, then if the reference destination non-imaging region 1403 is the non-imaging region 610-L1, then the correlation value r is closer to 1.0 compared to a case in which the reference destination non-imaging region 1403 is the non-imaging region 610-L2. This is because in the same row, the signal is read by the column read line at the same timing.

Also, the closer the reference origin imaging region 1401 and the reference destination non-imaging region 1403 are to each other, the closer the correlation value r tends to be to 1.0. In FIG. 13, for example, if the reference origin imaging region 1401 is the imaging region 600-12, then if the reference destination non-imaging region 1403 is the non-imaging region 610-L1, then the correlation value r is closer to 1.0 compared to a case in which the reference origin imaging region 1401 is the imaging region 600-11. This is thought to be because the closer the pixel positions are, the more similar the characteristics thereof are.

Also, if the reference origin control condition 1402 is the reference destination control condition 1404, then the correlation value r is a value close to 1.0. Specifically, if the reference origin control condition 1402 and the reference destination control condition 1404 are control conditions of the same type but different values, for example, then the correlation value r is closer to 1.0 than a case in which the reference origin control condition 1402 and the reference destination control condition 1404 are of different types. This is because if the control conditions are of the same type, then the operation condition of the reference origin imaging region 1401 is the same as the operation condition of the reference destination non-imaging region 1403.

The region to be subjected to correction of the noise component using the correlation value r may be limited to the reference origin imaging region 1401 not adjacent to the reference destination non-imaging region 1403. For example, if the reference destination non-imaging region 1403 is the non-imaging region 610-L1, then the reference origin imaging region 1401 is the imaging region 600-11. In this case, the imaging region 600-12 is adjacent to the imaging region 610-L1, and thus, is not set to be the reference origin imaging region 1401. As a result, the imaging region to be corrected is restricted, and thus, the amount of data in the correction table 1400 is reduced.

<Circuit Configuration of Imaging Pixel Region 600 and Optical Black Pixel Region 610>

Figure 15:
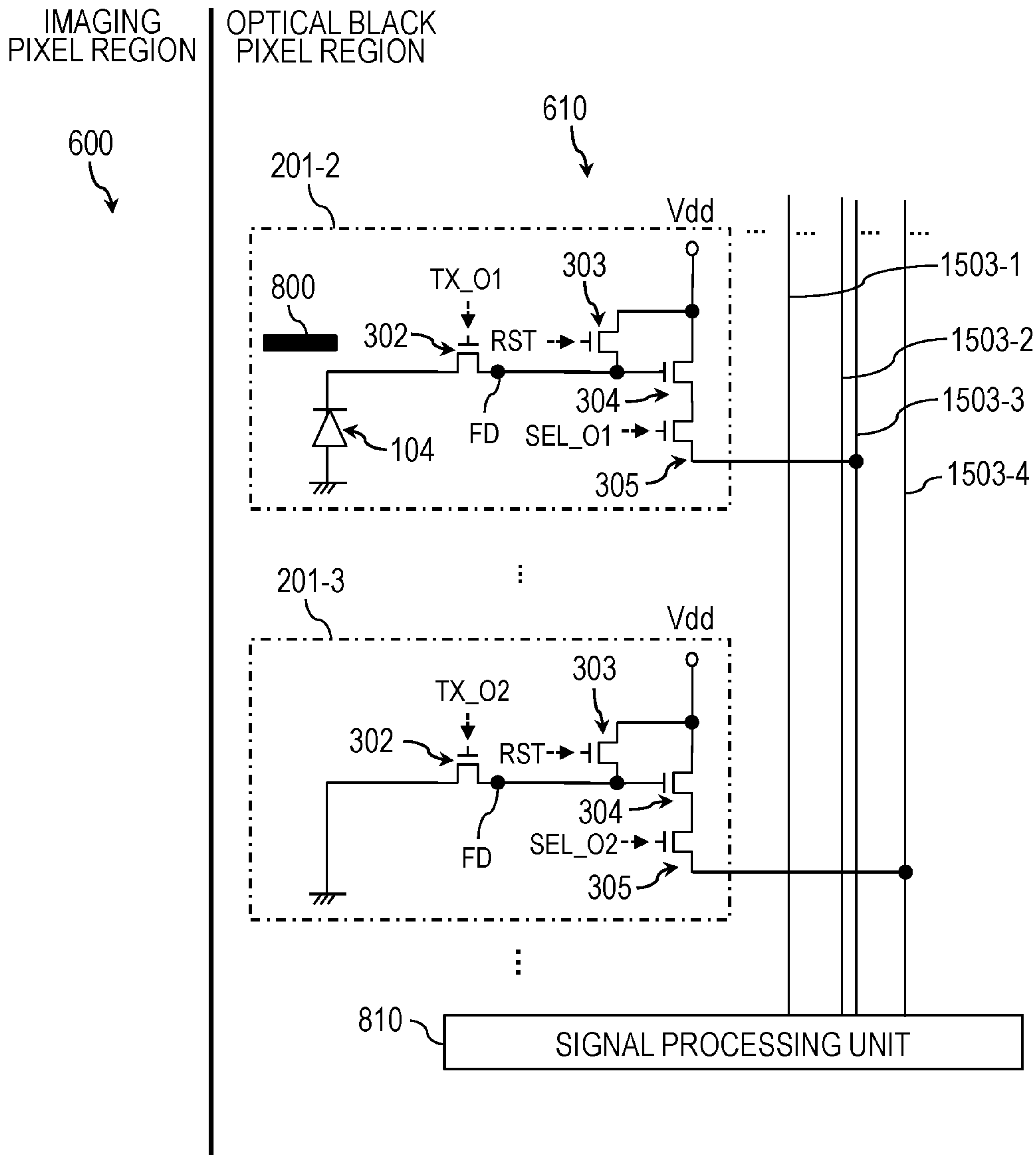
FIG. 15 is a circuit diagram showing a circuit configuration of the imaging pixel region and the optical black pixel region in the column direction.

FIG. 15 is a circuit diagram showing a circuit configuration of the imaging pixel region 600 and the optical black pixel region 610 in the column direction. The circuit configuration of the imaging pixel region 600 and the optical black pixel region 610 in the row direction is the same as in FIG. 11. In FIGS. 11 and 15, the pixels 201 in the imaging pixel region 600 are imaging pixels 201-1, and the pixels 201 in the optical black pixel region 610 are PD-equipped optical black pixels 201-2 and non-PD optical black pixels 201-3.

The selection transistor 305, upon having a control signal SEL_C, SEL_O1, or SEL_O2 applied to the gate thereof from the driver circuit 811, outputs a current at a voltage amplified by the amplification transistor 304 to column read lines 701 to 703. Column read lines 1503-1 to 1503-4 of FIG. 15 correspond to the column read line 703 of FIG. 9.

As described above, according to Embodiment 2, it is possible to execute black level correction using the non-imaging region 610-Lp correlated to the imaging region 600-*ij* for each of the imaging regions 600-*ij* of the imaging pixel region 600. Thus, it is possible to increase the accuracy of black level correction of each of the imaging regions 600-*ij*.

Embodiment 3

Embodiment 3 will be described next. In Embodiment 2, an image capture element in which the same control condition is set for the same row was described, but in Embodiment 3 an image capture element in which different control conditions are set for the same row will be described. The same components as those of Embodiments 1 and 2 are assigned the same reference characters and descriptions thereof are omitted.

Figure 16:
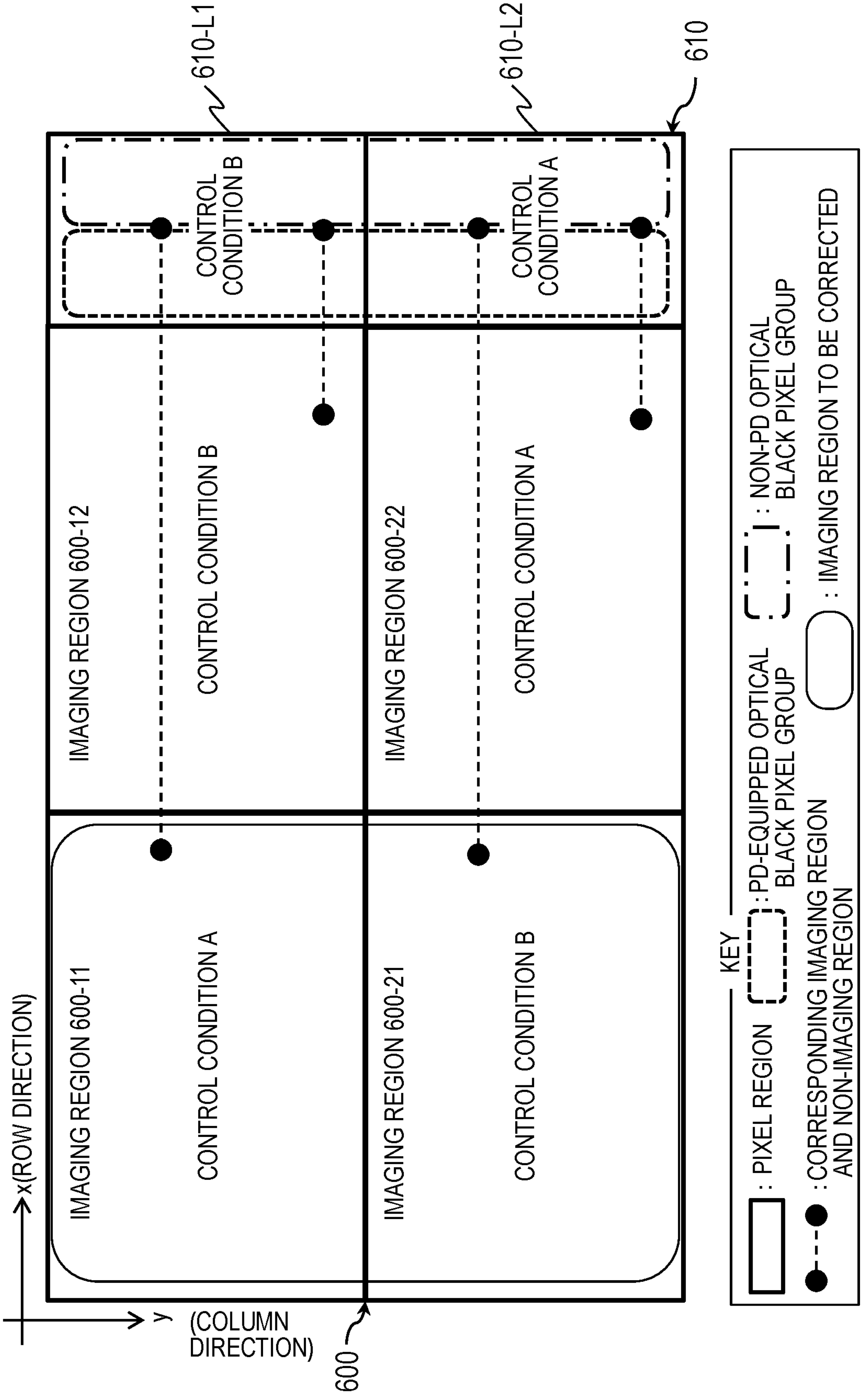
FIG. 16 is a descriptive view showing a relationship 1 between control conditions for the imaging pixel region and control conditions for the optical black pixel region according to Embodiment 3.
Figure 17:
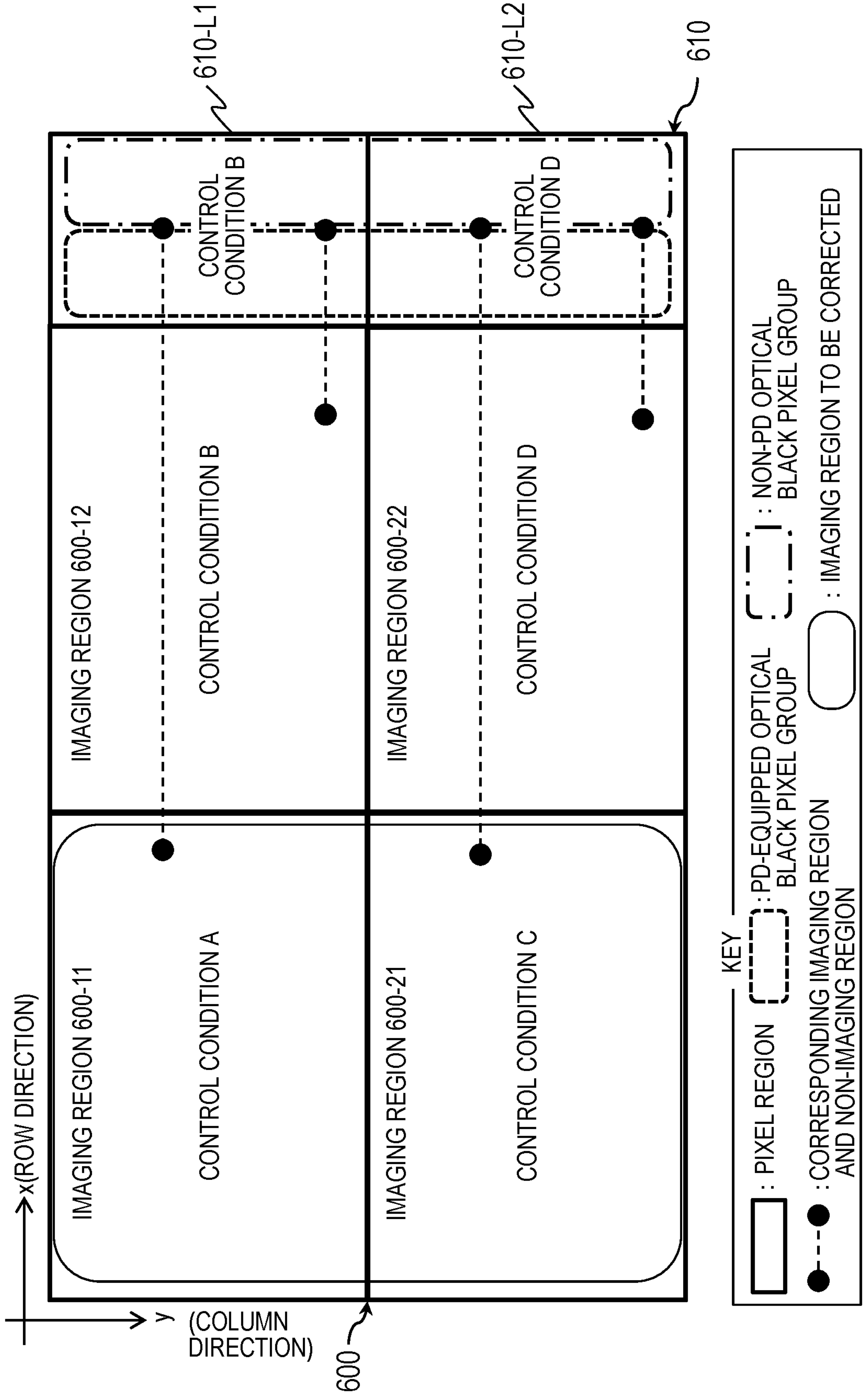
FIG. 17 is a descriptive view showing a relationship 2 between control conditions for the imaging pixel region and control conditions for the optical black pixel region according to Embodiment 3.

FIG. 16 is a descriptive view showing a relationship 1 between control conditions for the imaging pixel region and control conditions for the optical black pixel region according to Embodiment 3. FIG. 17 is a descriptive view showing a relationship 2 between control conditions for the imaging pixel region and control conditions for the optical black pixel region according to Embodiment 3. FIGS. 16 and 17, like FIG. 13, are also examples in which the number of non-imaging regions 610 is less than the number of imaging regions 600.

In FIG. 16, the control condition B is set for the imaging region 600-12 and the non-imaging region 610-L1 and the control condition A is set for the imaging region 600-22 and the non-imaging region 610-L2.

The difference from FIG. 13 is that in FIG. 13, the control condition A is used for the non-imaging region 610-L1, which is the reference destination non-imaging region 1403 of the imaging region 600-11, whereas in FIG. 16, the control condition for the non-imaging region 610-L1 is B rather than A. Similarly, in FIG. 13, the control condition B is used for the non-imaging region 610-L2, which is the reference destination non-imaging region 1403 of the imaging region 600-21, whereas in FIG. 16, the control condition for the non-imaging region 610-L2 is A rather than B.

Also, in FIG. 17, the control condition B is set for the imaging region 600-12 and the non-imaging region 610-L1, the control condition C is set for the imaging region 600-21, and the control condition D is set for the imaging region 600-22 and the non-imaging region 610-L2.

The difference from FIG. 13 is that in FIG. 13, the control condition A is used for the non-imaging region 610-L1, which is the reference destination non-imaging region 1403 of the imaging region 600-11, whereas in FIG. 17, the control condition for the non-imaging region 610-L1 is B rather than A. Similarly, in FIG. 13, the control condition B is used for the non-imaging region 610-L2, which is the reference destination non-imaging region 1403 of the imaging region 600-21, whereas in FIG. 17, the control condition for the non-imaging region 610-L2 is D rather than B.

Even in such a case, by setting the correlation value r to a suitable value, the signal processing unit 810 can calculate, to a high degree of accuracy, the black level correction using formula (1).

As described above, according to Embodiment 3, it is possible to execute black level correction using the non-imaging region 610-Lq outside of the correlated imaging pixel region 600 for each of the imaging regions 600-*ij* of the imaging pixel region 600. Thus, it is possible to increase the accuracy of black level correction of each of the imaging regions 600-*ij*.

Embodiment 4

Embodiment 4 will be described next. In Embodiment 2, an image capture element in which the same control condition is set for the same row was described, but in Embodiment 4 an image capture element in which the same control conditions are set for the same column will be described. The same components as those of Embodiments 1 to 3 are assigned the same reference characters and descriptions thereof are omitted.

<Relationship Between Control Conditions for Imaging Pixel Region and Control Conditions for Optical Black Pixel Region>

Figure 18:
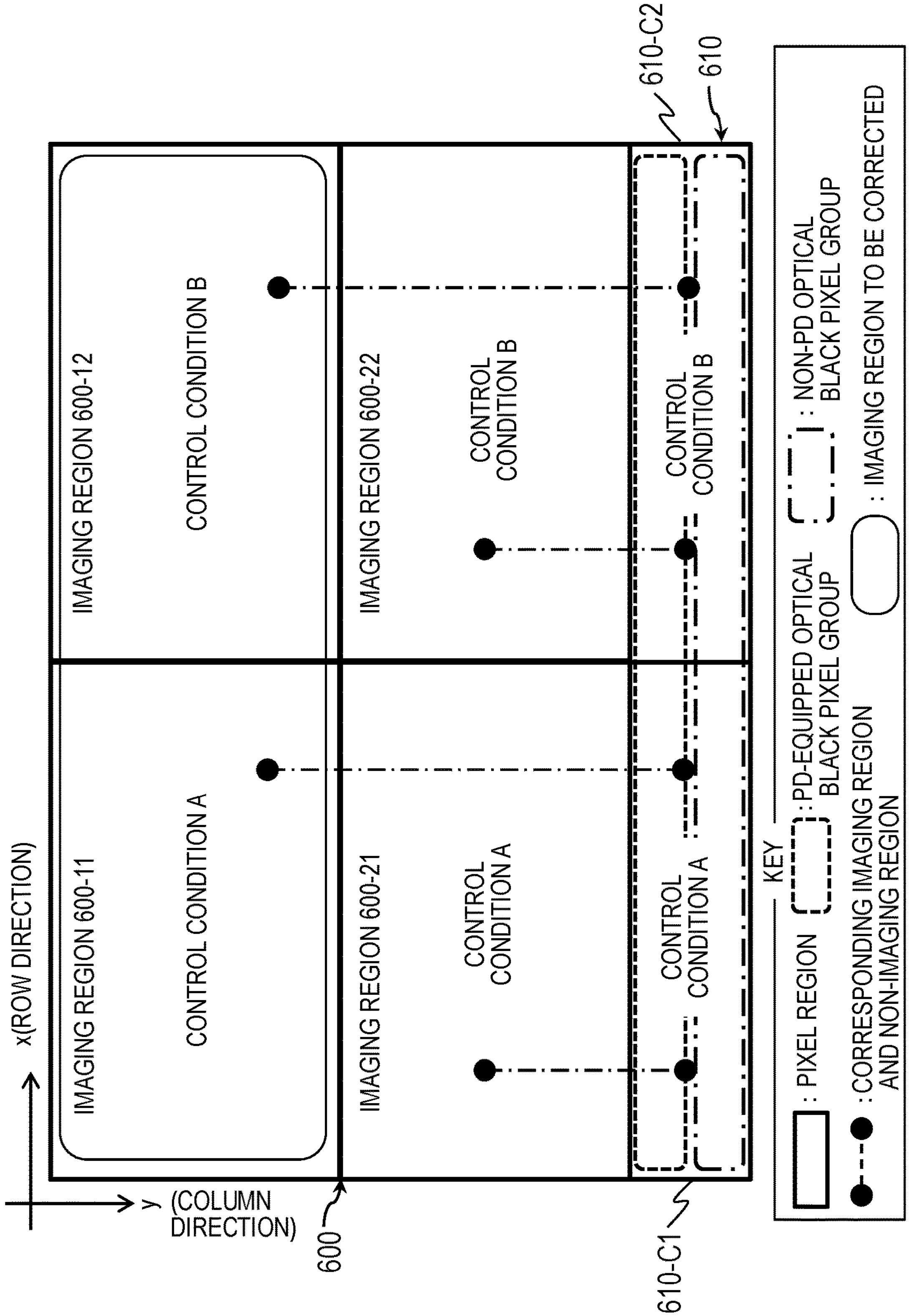
FIG. 18 is a descriptive view showing a relationship between control conditions for the imaging pixel region and control conditions for the optical black pixel region according to Embodiment 4.

FIG. 18 is a descriptive view showing a relationship between control conditions for the imaging pixel region and control conditions for the optical black pixel region according to Embodiment 4. The optical black pixel region 610 is constituted of a plurality of non-imaging regions 610-C1 and 610-C2 that do not perform imaging of subjects. The plurality of non-imaging regions 610-C1 and 610-C2 constitute a non-imaging region group arranged in the column direction. If not distinguishing among the non-imaging region group, the non-imaging regions are referred to as the non-imaging regions 610-Cq.

The optical black pixel region 610 is adjacent to the outside of the imaging pixel region 600. In the example of FIG. 18, the optical black pixel region is provided on the bottom edge of the imaging pixel region 600. The position at which the optical black pixel region 610 is arranged may be at least one of the top edge and the bottom edge of the imaging pixel region 600.

Also, the number of non-imaging regions 610-Cq is less than the number of imaging regions 600-*ij*. In FIG. 18, the number of non-imaging regions 610-Cq is two and the number of imaging regions 600-*ij* is four.

Next, control conditions set for the imaging pixel region 600 and the optical black pixel region 610 will be described. A control condition is set for each imaging region 600-*ij*. A control condition A is set for the imaging regions 600-11 and 600-21 and a control condition B is set for the imaging regions 600-12 and 600-22, for example. Similarly, the control condition A is set for the non-imaging region 610-C1 and the control condition B is set for the non-imaging region 610-C2.

The dotted lines having a black circle dot on each end indicate that the imaging region 600-*ij* and the non-imaging region 610-*pq* where the black circle dots are present in the row direction have corresponding black level correction. The imaging region 600-*ij* where the black circle dot is located is referred to as a "reference origin imaging region 600-*ij*" for black level correction and the non-imaging region 610-*pq* where the black circle dot is located is referred to as a "reference destination non-imaging region 610-*pq*" for black level correction (similarly applies to one-dot-chain lines with black circle dots on both ends to be mentioned later).

The pixel group arrayed in the column direction is connected to the same column read line and outputs respective analog signals, which are converted by the same A/D converter to digital signals. Thus, the reference origin imaging region 600-*ij* and the reference destination non-imaging region 610-Cq are considered to have a (high) correlation with regard to the dark current or the like. Therefore, if the output signal from the reference origin imaging region 600-*ij* is subjected to black level correction, then by subtracting the output signal coming from the reference origin imaging region 600-*ij* using the output signal of the reference destination non-imaging region 610-Cq, it is possible to perform high accuracy black level correction based on the reference origin imaging region 600-*ij*.

As described above, the number of non-imaging regions 610-Cq is less than the number of imaging regions 600-*ij*. Thus, one imaging region 600-*ij* can be associated with one or more non-imaging regions 610-Cq in performing black level correction.

<Correction Table>

FIG. 19 is a descriptive drawing showing an example of a correction table according to Embodiment 4. A correction table 1900 is a table in which a correlation value 1405 is set for each combination of a reference origin imaging region 1401, a reference origin control condition 1402, a reference destination non-imaging region 1403, and a reference destination control condition 1404. The reference destination non-imaging region 1403 stores the non-imaging region 610-Cq serving as the reference destination of the reference origin imaging region 600-*ij* as a value. The reference destination control condition 1404 stores the control condition of the non-imaging region 610-Cq as a value.

The correlation value 1405 stores a value (correlation value r(ijX, CqY); X is the reference origin control condition 1402 and Y is the reference destination control condition 1404) indicating the correlation between the reference origin imaging region 1401 for which the reference origin control condition 1402 was set and the reference destination non-imaging region 1403 for which the reference destination control condition 1404 was set.

The correlation value r(ijX, CqY) is sometimes simply referred to as the correlation value r. In the case of the correlation value r, a value closer to 1.0 indicates a greater correlation between the reference origin imaging region 1401 and the reference destination non-imaging region 1403, and values further from 1.0 indicate a lower correlation between the reference origin imaging region 1401 and the reference destination non-imaging region 1403.

Here, the output from the PD-equipped optical black pixel or the output from the non-PD optical black pixel is Q and the noise component after correction is Pin the reference destination non-imaging region 610-Cq. The relationship between P and Q is represented by the above formula (1).

If the reference origin imaging region 1401 and the reference destination non-imaging region 1403 are in the same column, then the correlation value r is close to 1.0. In FIG. 18, for example, if the reference origin imaging region 1401 is the imaging region 600-11, then if the reference destination non-imaging region 1403 is the non-imaging region 610-C1, then the correlation value r is closer to 1.0 compared to a case in which the reference destination non-imaging region 1403 is the non-imaging region 610-C2. This is because in the same column, the signal is read by the same column read line.

Also, the closer the reference origin imaging region 1401 and the reference destination non-imaging region 1403 are to each other, the closer the correlation value r is to 1.0. In FIG. 18, for example, if the reference origin imaging region 1401 is the imaging region 600-21, then if the reference destination non-imaging region 1403 is the non-imaging region 610-C1, then the correlation value r is closer to 1.0 compared to a case in which the reference origin imaging region 1401 is the imaging region 600-11. This is thought to be because the closer the pixel positions are, the more similar the characteristics thereof are.

The region to be subjected to correction of the noise component using the correlation value r may be limited to the reference origin imaging region 1401 not adjacent to the reference destination non-imaging region 1403. For example, if the reference destination non-imaging region 1403 is the non-imaging region 610-C1, then the reference origin imaging region 1401 is the imaging region 600-11.

In this case, the imaging region 600-21 is adjacent to the imaging region 610-C1, and thus, is not set to be the reference origin imaging region 1401. As a result, the imaging region to be corrected is restricted, and thus, the amount of data in the correction table 1900 is reduced.

<Circuit Configuration of Imaging Pixel Region 600 and Optical Black Pixel Region 610>

Figure 20:
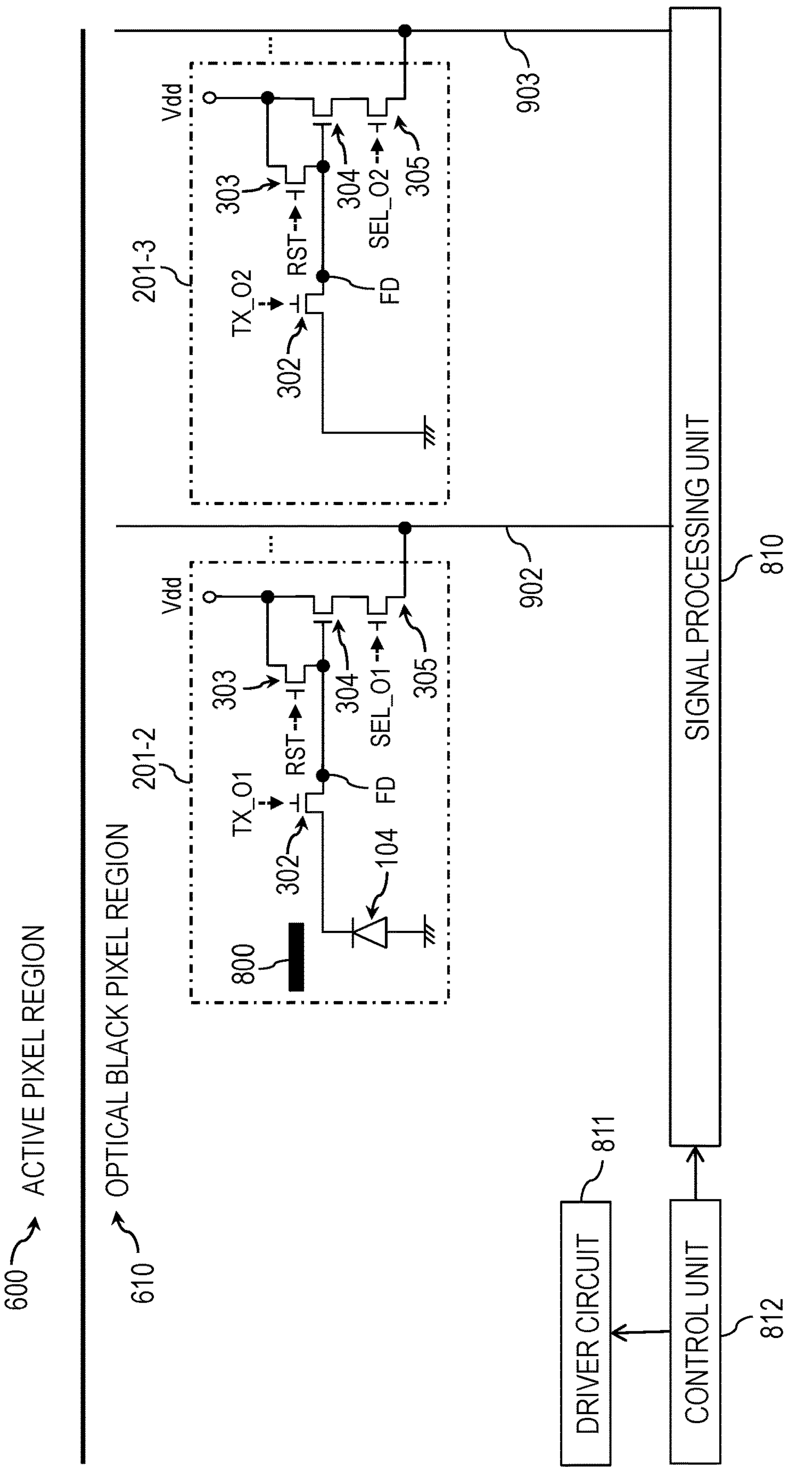
FIG. 20 is a circuit diagram showing a circuit configuration of the imaging pixel region and the optical black pixel region in the row direction.

FIG. 20 is a circuit diagram showing a circuit configuration of the imaging pixel region 600 and the optical black pixel region 610 in the row direction. The circuit configuration of the imaging pixel region 600 and the optical black pixel region 610 in the column direction is the same as in FIG. 10.

The selection transistor 305, upon having a control signal SEL_C, SEL_O1, or SEL_O2 applied to the gate thereof from the driver circuit 811, outputs a current at a voltage amplified by the amplification transistor 304 to column read lines 701 to 703. Column read lines 701-1 to 701-4 of FIG. 8 correspond to the column read lines 902 and 903 of FIG. 20.

As described above, according to Embodiment 4, it is possible to execute black level correction using the non-imaging region 610-Cq outside of the correlated imaging pixel region 600 for each of the imaging regions 600-*ij* of the imaging pixel region 600. Thus, it is possible to increase the accuracy of black level correction of each of the imaging regions 600-*ij*.

Embodiment 5

Embodiment 5 will be described next. In Embodiment 4, an image capture element in which the same control condition is set for the same column was described, but in Embodiment 5 an image capture element in which different control conditions are set for the same column will be described. The same components as Embodiments 1 to 4 are assigned the same reference characters and descriptions thereof are omitted.

Figure 21:
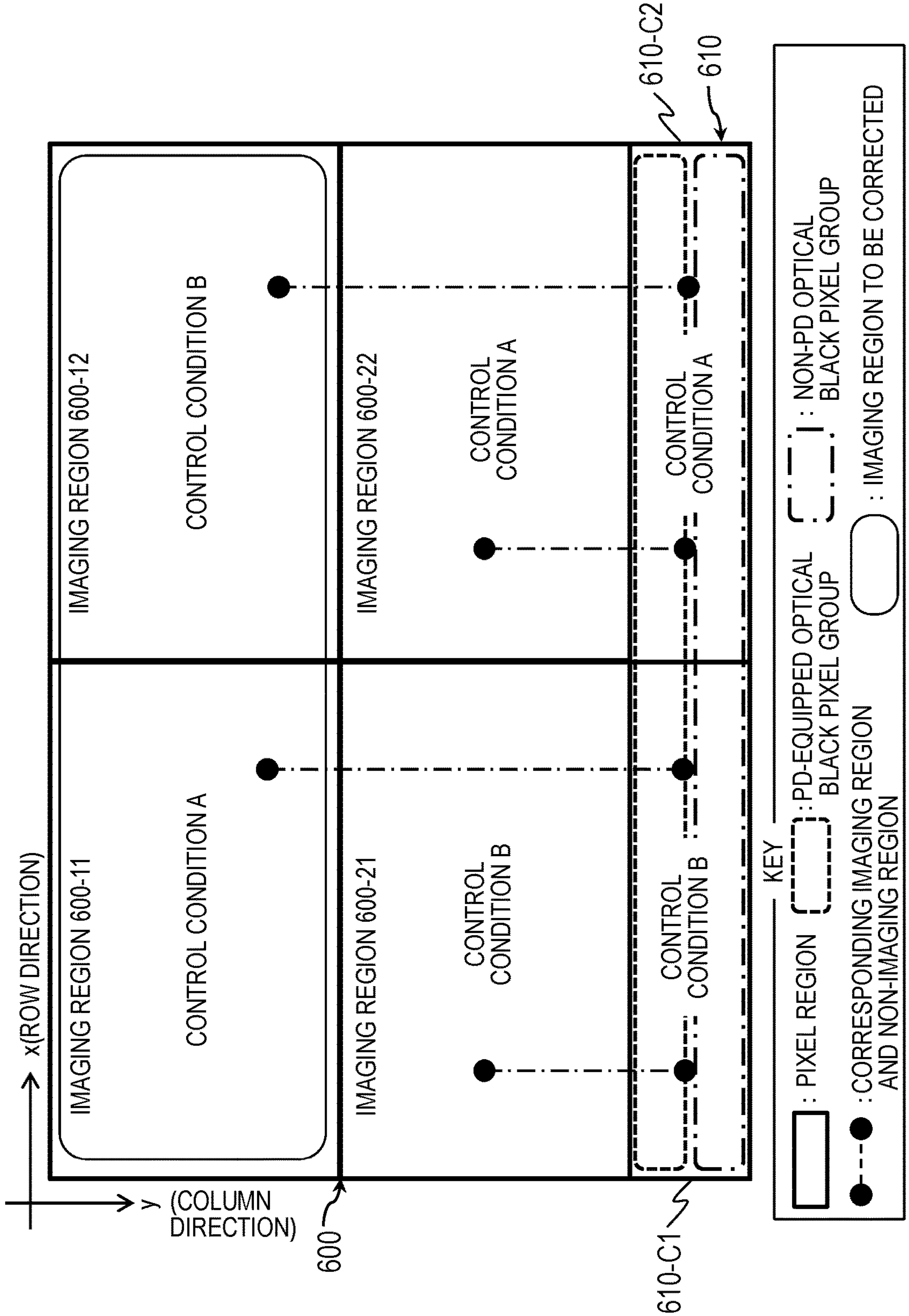
FIG. 21 is a descriptive view showing a relationship 1 between control conditions for the imaging pixel region and control conditions for the optical black pixel region according to Embodiment 5.
Figure 22:
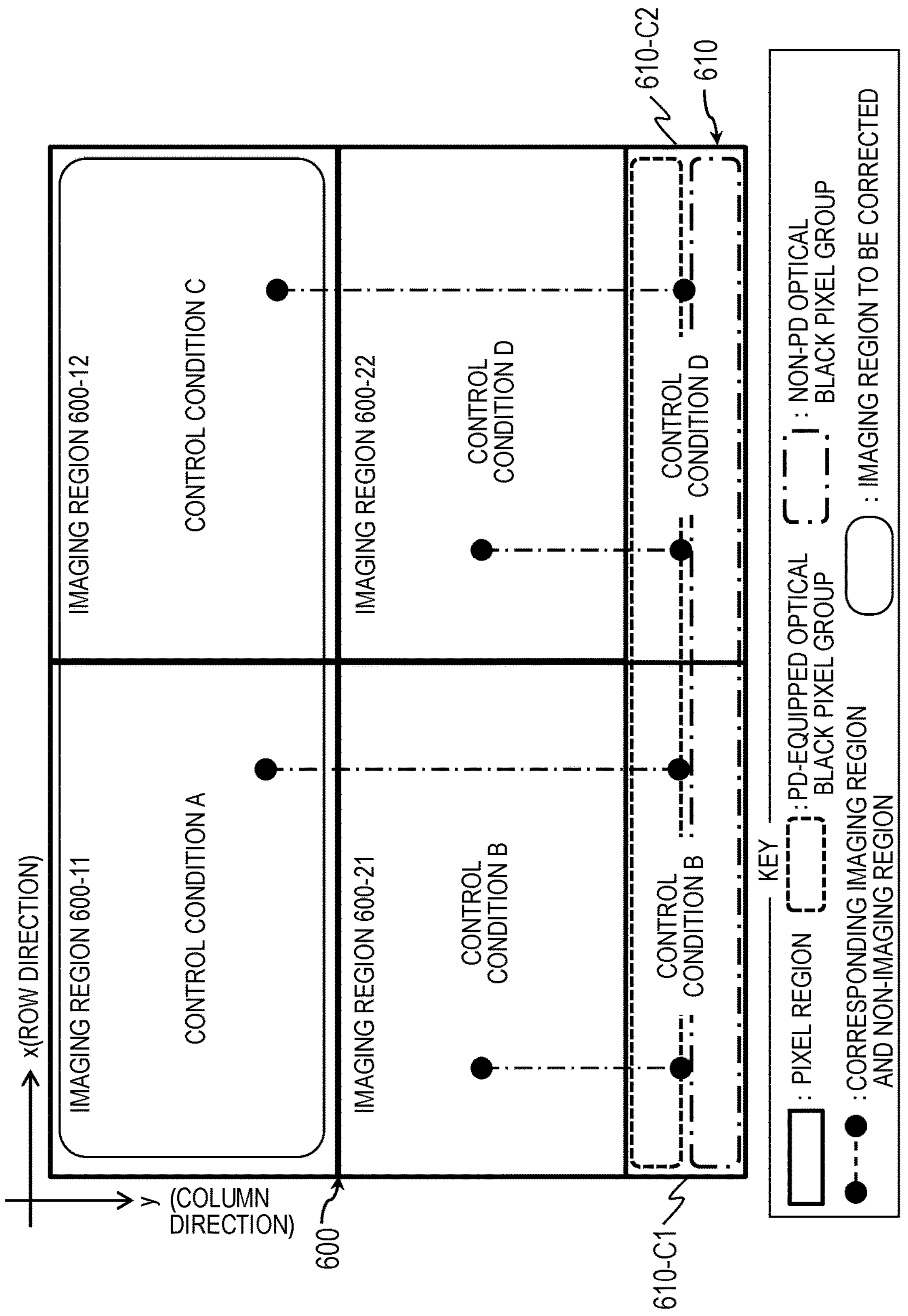
FIG. 22 is a descriptive view showing a relationship 2 between control conditions for the imaging pixel region and control conditions for the optical black pixel region according to Embodiment 5.

FIG. 21 is a descriptive view showing a relationship 1 between control conditions for the imaging pixel region and control conditions for the optical black pixel region according to Embodiment 5. FIG. 22 is a descriptive view showing a relationship 2 between control conditions for the imaging pixel region and control conditions for the optical black pixel region according to Embodiment 5. FIGS. 21 and 22, like FIG. 18, are also examples in which the number of non-imaging regions 610 is less than the number of imaging regions 600.

In FIG. 21, the control condition B is set for the imaging region 600-21 and the non-imaging region 610-C1, and the control condition A is set for the imaging region 600-22 and the non-imaging region 610-C2.

The difference from FIG. 18 is that in FIG. 18, the control condition A is used for the non-imaging region 610-C1, which is the reference destination non-imaging region 1403 of the imaging region 600-11, whereas in FIG. 21, the control condition for the non-imaging region 610-C1 is B rather than A. Similarly, in FIG. 18, the control condition B is used for the non-imaging region 610-C2, which is the reference destination non-imaging region 1403 of the imaging region 600-12, whereas in FIG. 21, the control condition for the non-imaging region 610-C2 is A rather than B.

Also, in FIG. 22, the control condition B is set for the imaging region 600-21 and the non-imaging region 610-C1, the control condition C is set for the imaging region 600-12, and the control condition D is set for the imaging region 600-22 and the non-imaging region 610-C2.

The difference from FIG. 18 is that in FIG. 18, the control condition A is used for the non-imaging region 610-C1, which is the reference destination non-imaging region 1403 of the imaging region 600-11, whereas in FIG. 22, the control condition for the non-imaging region 610-C1 is B rather than A. Similarly, in FIG. 18, the control condition B is used for the non-imaging region 610-C2, which is the reference destination non-imaging region 1403 of the imaging region 600-12, whereas in FIG. 22, the control condition for the non-imaging region 610-C2 is D rather than B.

Even in such a case, by setting the correlation value r to a suitable value, the signal processing unit 810 can conduct, to a high degree of accuracy, the black level correction using formula (1).

As described above, according to Embodiment 5, it is possible to execute black level correction using the non-imaging region 610-Cq outside of the correlated imaging pixel region 600 for each of the imaging regions 600-*ij* of the imaging pixel region 600. Thus, it is possible to increase the accuracy of black level correction of each of the imaging regions 600-*ij*.

Embodiment 6

In Embodiment 6, the number of non-imaging regions in an optical black pixel region to be described later is less than the number of imaging regions within an imaging pixel region. The same components as Embodiments 1 to 5 are assigned the same reference characters and descriptions thereof are omitted.

<Relationship Between Control Conditions for Imaging Pixel Region 600 and Control Conditions for Optical Black Pixel Region 610>

A relationship between control conditions for the imaging pixel region 600 and control conditions for the optical black pixel region 610 according to Embodiment 6 will be described with reference to FIGS. 23 and 24. This relationship is that the optical black pixel regions 610 are provided within the imaging pixel region 600, and the number of non-imaging regions provided in the optical black pixel regions 610 is less than the number of imaging regions within the imaging pixel region 600. Regarding FIG. 24, the description will focus on differences from FIG. 23, and thus, description of sections that are in common with FIG. 23 will be omitted.

Figure 23:
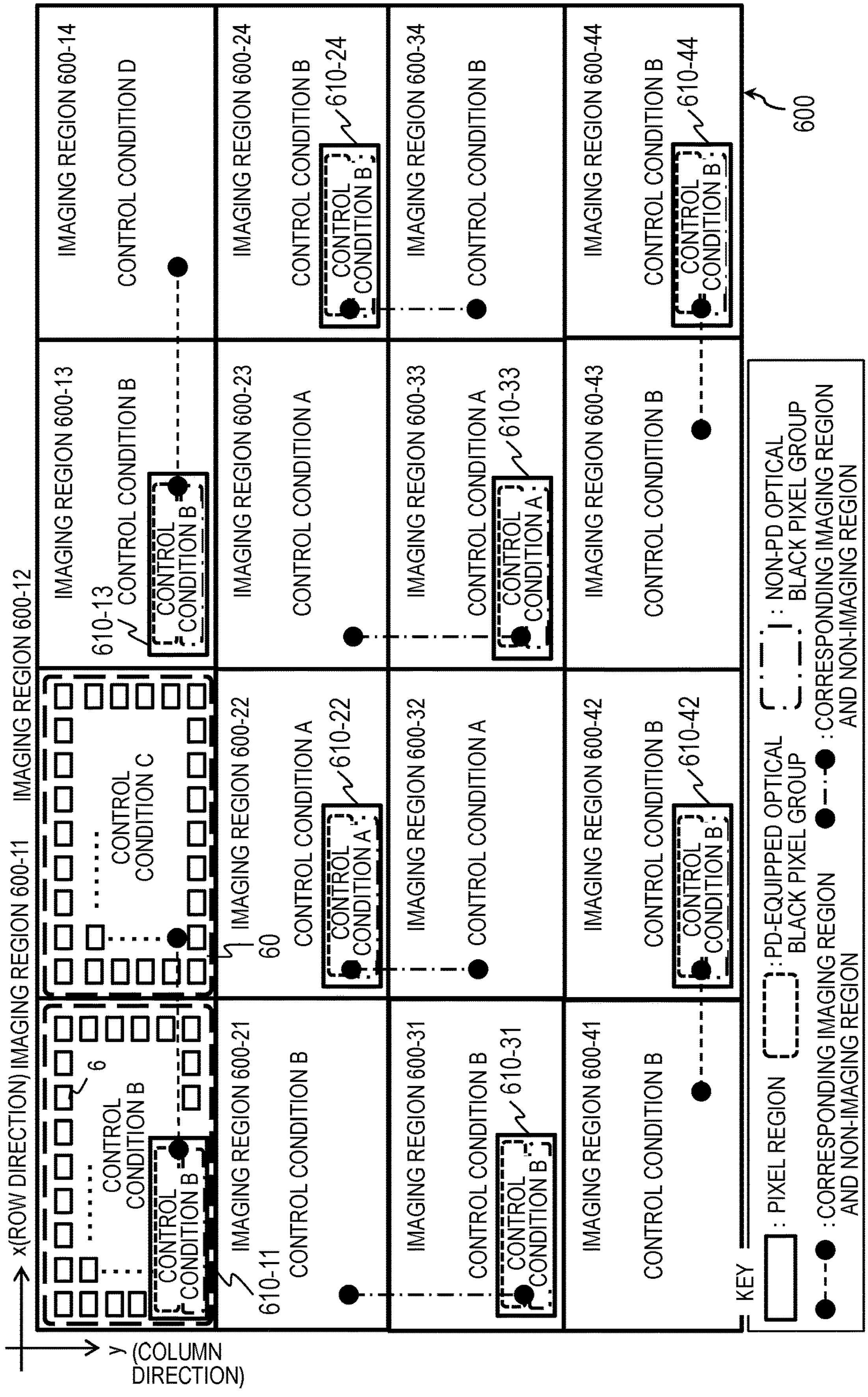
FIG. 23 is a descriptive view showing a relationship 1 between control conditions for the imaging pixel region and control conditions for the optical black pixel regions according to Embodiment 6.

FIG. 23 is a descriptive view showing a relationship 1 between control conditions for the imaging pixel region 600 and control conditions for the optical black pixel regions according to Embodiment 6. The imaging region is a group of one or more blocks 202, for example. In FIG. 23, for ease of explanation, the imaging pixel region 600 is constituted of four rows by four columns of imaging regions 600-11 to 600-14, 600-21 to 600-24, 600-31 to 600-34, and 600-41 to 600-44. However, the imaging pixel region 600 may be constituted of m rows by n columns (m and n are integers of one or greater; however, there are at least two imaging regions 600) other than four rows by four columns. If not distinguishing between the imaging regions 600-11 to 600-14, 600-21 to 600-24, 600-31 to 600-34, and 600-41 to 600-44, these are collectively referred to as the imaging regions 600-*ij*.

The optical black pixel regions 610 are constituted of a plurality of non-imaging regions 610-11, 610-13, 610-22, 610-24, 610-31, 610-33, 610-42, and 610-44 that do not perform imaging of subjects. If not distinguishing between the non-imaging regions 610-11, 610-134, 610-122, 610-24, 610-31, 610-33, 610-42, and 610-44, these are collectively referred to as the non-imaging regions 610-*ij*. The non-imaging regions 610-*ij* are provided in the imaging regions 600-*ij* arranged in i rows by j columns.

The positional relationship between the imaging regions 600-*ij* and the non-imaging regions 610-*ij* will be described in detail. As previously described, each imaging region 600-*ij* has a configuration in which imaging pixels 6 are arranged two-dimensionally. The imaging pixels 6 of each imaging region 600-*ij* have a similar configuration to the block 202 described with reference to FIG. 2, and can be controlled under differing control conditions for the respective imaging regions 600-*ij*, for example. The configuration shown in Embodiment 6 includes the imaging regions 600-*ij* having arranged therein the non-imaging regions 610-*ij* and the imaging regions 600-*ij* not having arranged therein the non-imaging regions 610-*ij*.

In the configuration shown in FIG. 23, a closed region 60 including all imaging pixels 6 included in the imaging region 600-11 that is connected to control lines (e.g., TX wiring 307) provided in the imaging region 600-11, and set such that the outer edges are at the minimum length is considered. In this case, the non-imaging region 610-11 is disposed inside the closed region 60. Also, in the configuration shown in FIG. 23, the closed region 60 including all imaging pixels 6, included in the imaging region 600-121, that is connected to control lines (e.g., TX wiring 307) provided in the imaging region 600-12, and set such that the outer edges are at the minimum length, is considered. In this case, the non-imaging region 610-*ij* is not disposed inside the closed region 60.

Thus, the configuration shown in FIG. 23 includes the imaging regions (imaging region 600-11, imaging region 600-13, imaging region 600-22, etc.) having arranged therein the non-imaging regions 610-*ij* and the imaging regions (imaging region 600-12, imaging region 600-14, imaging region 600-21, etc.) not having arranged therein the non-imaging regions 610-*ij*.

By being provided with such a configuration, in the imaging regions 600-*ij* having disposed therein the non-imaging regions 610-*ij*, high accuracy black level correction is executed due to the strong correlation regarding the dark current and the like between the "reference origin imaging region 600-*ij*" and the "reference destination non-imaging region 610-*pq*." In the imaging regions 600-*ij* not having arranged therein the non-imaging regions 610-*ij*, black level correction is executed using the output signal of the non-imaging region 610-*ij* disposed in the adjacent imaging region 600-*ij*. As a result, so-called defective pixels do not occur. Thus, it is possible to ensure a high quality image generated by the imaging pixels 6 of each imaging region 600-*ij*.

As shown in FIG. 23, the imaging regions 600-*ij* including the optical black pixel region 610 are arranged discretely. The imaging regions 600-*ij* including the optical black pixel region 610 are in a zigzag arrangement, for example. The optical black pixel regions 610 are in a zigzag arrangement within the imaging pixel region 600, for example. If the number of imaging regions including the non-imaging region 610-*ij* is less than the number of imaging regions 600-*ij*, then the arrangement is not limited to a zigzag arrangement.

One non-imaging region 610-*ij* includes the PD-equipped optical black pixel group and the non-PD optical black pixel group. The optical black pixel regions 610 have the PD-equipped optical black pixel group and the non-PD optical black pixel group. Also, the number of imaging regions including the non-imaging regions 610-*ij* is less than the number of imaging regions 600-*ij*. In FIG. 23, the number of non-imaging regions 610-*ij* is eight and the number of imaging regions 600-*ij* is 16.

Next, control conditions set for the imaging pixel region 600 and the optical black pixel region 610 will be described. A control condition is set for each imaging region 600-*ij* and each non-imaging region 610-*ij*. The control conditions for the non-imaging regions 610-*ij* are the same as the control conditions for the imaging regions 600-*ij* including the non-imaging regions 610-*ij*. For example, the control condition for the non-imaging region 610-11 is B and the control condition for the imaging region 600-11 including the non-imaging region 610-11 is also B.

Also, although not depicted with the dotted line with black circle dots on both ends, non-imaging regions 610-*ij* have, as the "reference origin imaging regions 600-*ij*," the imaging regions 600-*ij* including the non-imaging regions 610-*ij*. Thus, the non-imaging region 610-11 is a reference destination imaging region of the imaging region 600-11 including the non-imaging region 610-11 as well as being the reference destination imaging region of the imaging region 600-12, which does not include the non-imaging region 610-11.

A pixel group arranged in the row direction is selected at the same timing for each row selection circuit or block 202, and outputs a pixel signal. Thus, the reference origin imaging region 600-*ij* and the reference destination non-imaging region 610-*ij* are considered to have a correlation with regard to the dark current or the like. Therefore, if the output signal from the reference origin imaging region 600-*ij* is subjected to black level correction, then by subtracting the output signal coming from the reference origin imaging region 600-*ij* using the output signal coming from the reference destination non-imaging region 610-*ij*, it is possible to perform high accuracy black level correction based on the reference origin imaging region 600-*ij*.

Also, the one-dot-chain lines having a black circle dot on each end indicate that the imaging regions 600-*ij* where the black circle dots are present refer to the control conditions of the non-imaging regions 610-*ij* in the column direction. Also, although not depicted with the one-dot-chain line with black circle dots on both ends, the non-imaging regions 610-*ij* have, as the "reference origin imaging regions 600-*ij*," the imaging regions 600-*ij* including the non-imaging regions 610-*ij*. Thus, the non-imaging region 610-31 is a reference destination imaging region of the imaging region 600-31 including the non-imaging region 610-31 as well as being the reference destination imaging region of the imaging region 600-21, which does not include the non-imaging region 610-31.

The pixel group arrayed in the column direction is connected to the same column read line and outputs respective analog signals at the level of each block 202, the analog signals being converted by the same A/D converter to digital signals. Thus, the reference origin imaging region 600-*ij* and the reference destination non-imaging region 610-*ij* are considered to have a correlation with regard to the dark current or the like. Therefore, if the output signal from the reference origin imaging region 600-*ij* is subjected to black level correction, then by subtracting the output signal coming from the reference origin imaging region 600-*ij* using the output signal coming from the reference destination non-imaging region 610-*ij*, it is possible to perform high accuracy black level correction based on the reference origin imaging region 600-*ij*.

As described above, the number of non-imaging regions 610-*ij* is less than the number of imaging regions 600-*ij*. Thus, one non-imaging region 610-*ij* can be associated with one or more imaging regions 600-*ij* in performing black level correction. Whether to set the row direction or column direction non-imaging regions 610-*ij* as the reference destination for the imaging regions 600-*ij* may be set in advance, and may be set according to the control conditions of the respective imaging regions 600-*ij* and the respective non-imaging regions 610-*pq*. Alternatively, among the output signals of the row direction and column direction non-imaging regions 610-*pq*, the larger value, the smaller value, or an average value may be used for the imaging regions 600-*ij*.

Also, by providing the non-imaging regions 610-*ij* in the imaging regions 600-*ij*, the optical black pixel region need not be disposed outside of the imaging pixel region 600, and thus, it is possible to prevent an expansion in size of the image capture element. Also, the optical black pixel region need not be disposed outside of the imaging pixel region 600, and thus, it is possible to expand the area of the imaging pixel region 600.

Figure 24:
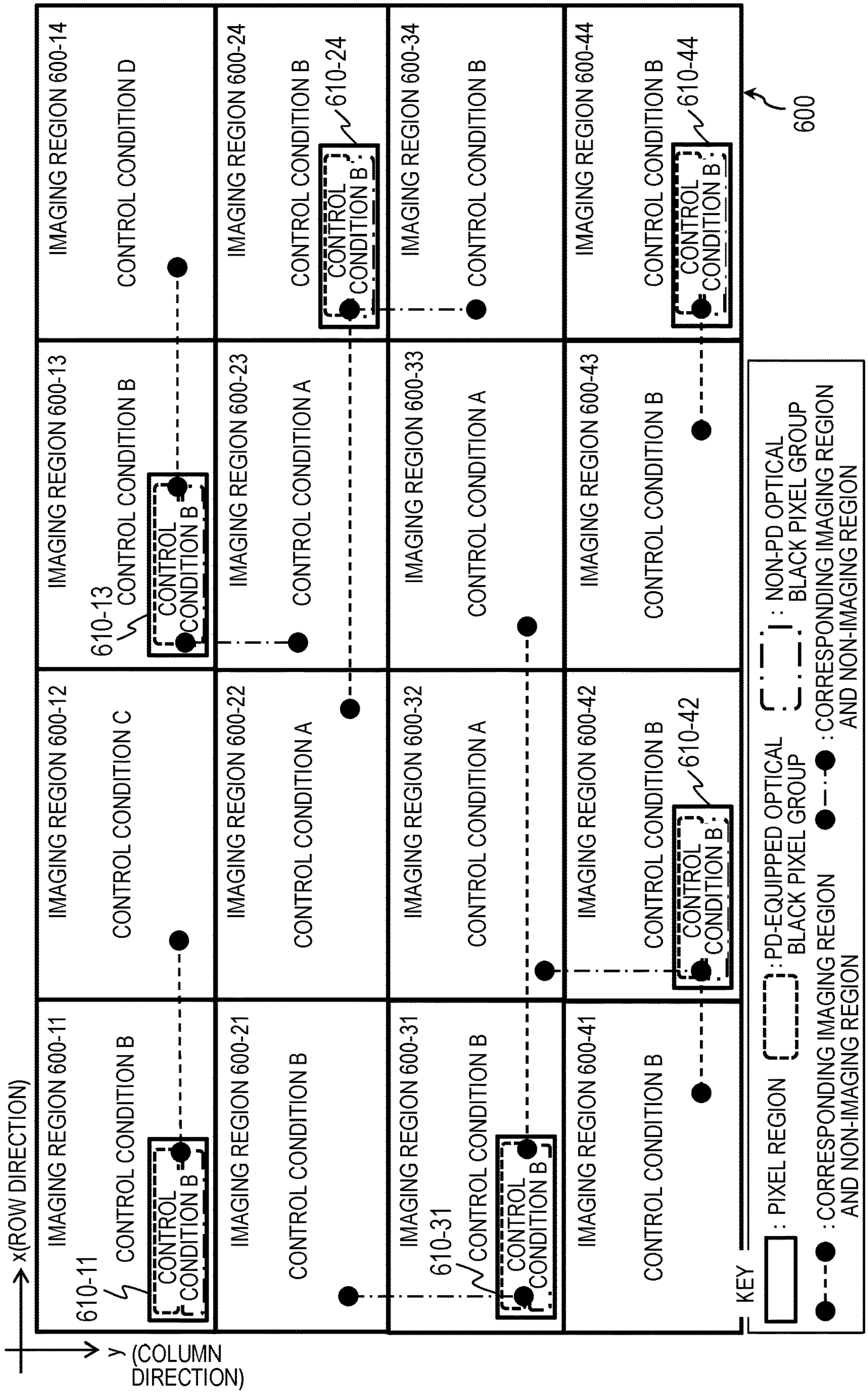
FIG. 24 is a descriptive view showing a relationship 2 between control conditions for the imaging pixel region and control conditions for the optical black pixel regions according to Embodiment 6.

FIG. 24 is a descriptive view showing a relationship 2 between control conditions for the imaging pixel region 600 and control conditions for the optical black pixel regions 610 according to Embodiment 6. FIG. 24, like FIG. 23, is also an example in which the number of non-imaging regions 610-*ij* is greater than or equal to the number of imaging regions 600-*ij*. In FIG. 24, the non-imaging regions 610-*ij* are not provided in the four imaging regions 600-22, 600-23, 600-32, and 600-33 located in the center of the imaging pixel region 600.

The reason is that the primary subject appears in the center of the imaging pixel region 600, and imaging plane phase difference detection pixels that focus on the primary subject appear more frequently in the center of the imaging pixel region 600 than in the surrounding imaging regions 600-11 to 600-14, 600-21, 600-24, 600-31, 600-34, and 600-41 to 600-44.

The non-imaging regions 610-*ij* are defective pixels in terms of generating an image, and thus, interpolation is necessary and there is a high probability of image quality degradation. Thus, a configuration may be adopted in which the non-imaging regions 610-*ij* are not disposed in the vicinity of the center region where the primary subject is believed to have a high probability of appearing, or the number of non-imaging regions 610-*ij* disposed outside of center region is greater than the number of non-imaging regions 610-*ij* disposed in the center region. Also, a configuration may be adopted in which the number of non-imaging regions 610-*ij* increases, moving outward from the center region.

The non-imaging regions 610-*ij* may be provided at the edge of the imaging pixel region 600 (outside of the imaging regions 600-*ij*) or in the imaging regions 600-*ij* closer to the edge than the center of the imaging pixel region 600. Also, the non-imaging regions 610-*ij* are not limited to being provided in the center of the imaging pixel region 600, and may be provided in the imaging regions 600-*ij* having a prescribed number or less of the imaging plane phase difference detection pixels within the imaging pixel region 600, or may be provided in imaging regions 600-*ij* with a relatively low number of imaging plane phase difference detection pixels within the imaging pixel region 600.

<Circuit Configuration of Imaging Pixel Region 600 and Optical Black Pixel Region 610>

The circuit configuration of the imaging pixel region 600 and the optical black pixel region 610 in the row direction is as shown in FIG. 9, and the circuit configuration of the imaging pixel region 600 and the optical black pixel regions 610 in the column direction is as shown in FIG. 10.

The signal processing unit 710 may interpolate signals at the position of the non-PD optical black pixel 201-3 using signals outputted from the imaging pixel 201-1 present in the periphery of the non-PD optical black pixel 201-3. The interpolation method used by the signal processing unit 710 may be an interpolation method that employs median processing, an interpolation method based on gradients, or adaptive color plane interpolation. This similarly applies to the imaging plane phase difference detection pixels.

<Correction Table>

FIG. 25 is a descriptive drawing showing an example of a correction table according to Embodiment 6. A correction table 2500 is a table in which a correlation value 1405 is set for each combination of a reference origin imaging region 1401, a reference origin control condition 1402, a reference destination non-imaging region 1403, and a reference destination control condition 1404.

The reference origin imaging region 1401 stores the reference origin imaging region 600-*ij* as a value. The reference origin control condition 1402 stores the control condition of the reference origin imaging region 600-*ij* as a value. The reference destination non-imaging region 1403 stores the non-imaging region 610-Lp serving as the reference destination of the reference origin imaging region 600-*ij* as a value. The reference destination control condition 1404 stores the control condition of the non-imaging region 610-*ij* as a value.

The correlation value 1405 stores a value (correlation value r(ijX, ijY); X is the reference origin control condition 1402 and Y is the reference destination control condition 1404) indicating the correlation between the reference origin imaging region 1401 for which the reference origin control condition 1402 was set and the reference destination non-imaging region 1403 for which the reference destination control condition 1404 was set.

The correlation value r(ijX, ijY) is sometimes simply referred to as the correlation value r. In the case of the correlation value r, a value closer to 1.0 indicates a greater correlation between the reference origin imaging region 1401 and the reference destination non-imaging region 1403, and values further from 1.0 indicate a lower correlation between the reference origin imaging region 1401 and the reference destination non-imaging region 1403.

Here, the output from the PD-equipped optical black pixel or the output from the non-PD optical black pixel is Q and the noise component after correction is Pin the reference destination non-imaging region 610-*ij*. The relationship between P and Q is represented by the above formula (1).

If the reference destination non-imaging region 1403 and the reference origin imaging region 1401 are included, then the correlation value r is close to 1.0. In FIG. 23, for example, if the reference origin imaging region 1401 is the imaging region 600-11, then if the reference destination non-imaging region 1403 is the non-imaging region 610-11, then the correlation value r is closer to 1.0 compared to a case in which the reference destination non-imaging region 1403 is the non-imaging region 610-12. This is because, if the reference destination non-imaging region 1403 and the reference origin imaging region 1401 are included, then reading is performed along the same column read line.

If the reference origin imaging region 1401 and the reference destination non-imaging region 1403 are in the same row, then the correlation value r is close to 1.0. In FIG. 23, for example, if the reference origin imaging region 1401 is the imaging region 600-11, then if the reference destination non-imaging region 1403 is the non-imaging region 610-11, then the correlation value r is closer to 1.0 compared to a case in which the reference destination non-imaging region 1403 is the non-imaging region 610-22. This is because in the same row, the signal is read by the column read line at the same timing.

Also, the closer the reference origin imaging region 1401 and the reference destination non-imaging region 1403 are to each other, the closer the correlation value r is to 1.0. In FIG. 23, for example, if the reference origin imaging region 1401 is the imaging region 600-11, then if the reference destination non-imaging region 1403 is the non-imaging region 610-12, then the correlation value r is closer to 1.0 compared to a case in which the reference origin imaging region 1401 is the imaging region 600-14. This is thought to be because the closer the pixel positions are, the more similar the characteristics thereof are.

Also, if the reference origin control condition 1402 is the reference destination control condition 1404, then the correlation value r is a value close to 1.0. Specifically, if the reference origin control condition 1402 and the reference destination control condition 1404 are control conditions of the same type but different values, for example, then the correlation value r is closer to 1.0 than a case in which the reference origin control condition 1402 and the reference destination control condition 1404 are of different types. This is because if the control conditions are of the same type, then the operation condition of the reference origin imaging region 1401 is believed to be similar to the operation condition of the reference destination non-imaging region 1403.

As described above, according to Embodiment 6, it is possible to execute black level correction using the non-imaging region 610-*pq* outside of the correlated imaging pixel region 600 for each of the imaging regions 600-*ij* of the imaging pixel region 600. Thus, it is possible to increase the accuracy of black level correction of each of the imaging regions 600-*ij*.

Embodiment 7

<Relationship Between Control Conditions for Imaging Pixel Region and Control Conditions for Optical Black Pixel Region>

Next, a relationship between control conditions for the imaging pixel region and control conditions for the optical black pixel region according to Embodiment 7 will be described. Embodiment 7 is a configuration in which optical black pixel regions 610 are also provided outside of the imaging pixel region 600 of Embodiment 6. The same sections as Embodiment 6 are assigned the same reference characters and descriptions thereof are omitted.

Figure 26:
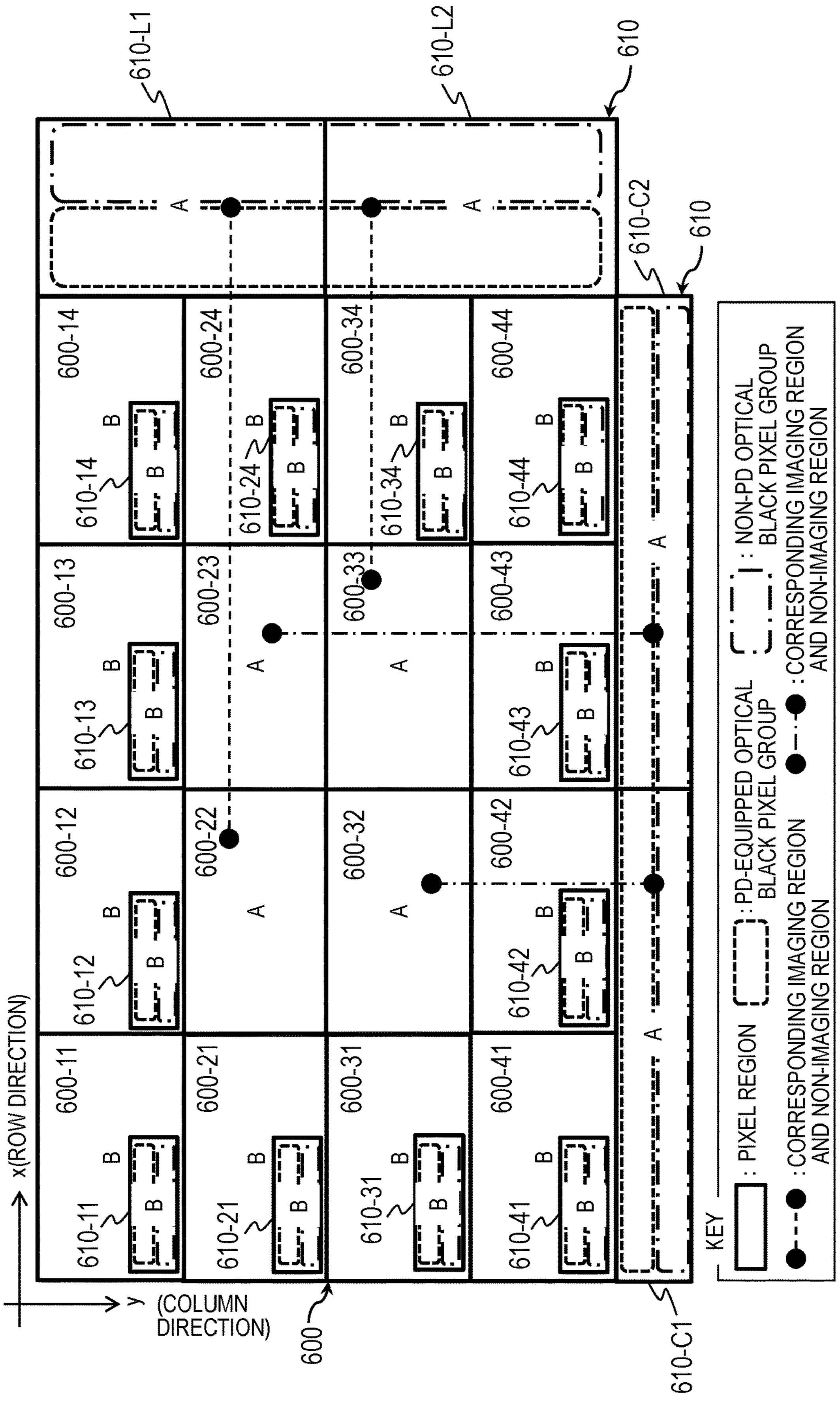
FIG. 26 is a descriptive view showing a relationship between control conditions for the imaging pixel region and control conditions for the optical black pixel region.

FIG. 26 is a descriptive view showing a relationship between control conditions for the imaging pixel region and control conditions for the optical black pixel region. The optical black pixel regions 610 are located inside and outside of the imaging pixel region 600. First, the optical black pixel regions 610 present in the imaging pixel region 600 (hereinafter referred to as internal optical black pixel regions 610) will be described.

The internal optical black pixel regions 610 are constituted of a plurality of internal non-imaging regions 610-11 to 610-14, 610-21, 610-24, 610-31, 610-34, 610-41, and 610-44 that do not perform imaging of subjects. If not distinguishing between the internal non-imaging regions 610-11 to 610-14, 610-21, 610-24, 610-31, 610-34, 610-41, and 610-44, these are collectively referred to as the internal non-imaging regions 610-*ij*. The internal non-imaging regions 610-*ij* are provided in the imaging regions 600-*ij* arranged in i rows by j columns.

FIG. 26 shows the imaging region 600 in which the internal optical black pixel regions 610 are disposed, and the internal optical black pixel regions 610 are in a zigzag arrangement within the imaging pixel region 600, for example. If the number of internal non-imaging regions 610-*ij* is less than the number of imaging regions 600-*ij*, then the arrangement is not limited to a zigzag arrangement.

One internal non-imaging region 610-*ij* includes the PD-equipped optical black pixel group and the non-PD optical black pixel group. The optical black pixel regions 610 have the PD-equipped optical black pixel group and the non-PD optical black pixel group. The PD-equipped optical black pixel group is a group of optical black pixels equipped with PDs. The PD-equipped optical black pixels are black pixels having the PDs 104. Specifically, for example, the PD-equipped optical black pixels are pixels having a light-shielding layer that blocks incident subject light.

Also, the number of internal non-imaging regions 610-*ij* is less than the number of imaging regions 600-*ij*. In FIG. 26, the number of internal non-imaging regions 610-*ij* is 12 and the number of imaging regions 600-*ij* is 16.

Next, the optical black pixel regions 610 present outside of the imaging pixel region 600 (hereinafter referred to as external optical black pixel regions 610) will be described.

The external optical black pixel regions 610 are constituted of a plurality of external non-imaging regions 610-L1 and 610-L2, and 610-C1 and 610-C2 that do not perform imaging of subjects. The plurality of external non-imaging regions 610-L1 and 610-L2 (two in the example of FIG. 26) constitute an external non-imaging region group arranged in the column direction. If not distinguishing among the external non-imaging region group arranged in the column direction, the external non-imaging regions are referred to as the external non-imaging regions 610-Lp.

The plurality of external non-imaging regions 610-C1 and 610-C2 (two in the example of FIG. 26) constitute an external non-imaging region group arranged in the row direction. If not distinguishing among the non-imaging region group arranged in the row direction, the external non-imaging regions are referred to as the external non-imaging regions 610-Cq. If not distinguishing between the plurality of external non-imaging regions 610-L1, 610-L2, 610-C1, and 610-C2, these are collectively referred to as the external non-imaging regions 610-*pq*. One external non-imaging region 610-*pq*, similar to the internal non-imaging region 610-*ij*, includes the PD-equipped optical black pixel group and the non-PD optical black pixel group.

The external optical black pixel regions 610, similar to the internal optical black pixel regions 610, are adjacent to the outside of the imaging pixel region 600. In the example of FIG. 26, the external optical black pixel regions 610 are provided on the right edge and the bottom edge of the imaging pixel region 600. The positions at which the external optical black pixel regions 610 are arranged may be at least one of the top edge, the bottom edge, the right edge, and the left edge of the imaging pixel region 600.

The external optical black pixel regions 610, similar to the internal optical black pixel regions 610, have the PD-equipped optical black pixel group and the non-PD optical black pixel group. Also, the number of external non-imaging regions 610-*pq* is greater than or equal to the number of imaging regions 600-*ij* where the internal non-imaging regions 610-*ij* are not present, for example. In FIG. 26, the number of external non-imaging regions 610-*pq* is four and the number of imaging regions 600-*ij* is four.

Next, control conditions set for the imaging pixel region 600 and the optical black pixel region 610 will be described. A control condition is set for each imaging region 600-*ij*, each internal non-imaging region 610-*ij*, and each external non-imaging region 610-*ij*.

The control condition B is set for the imaging regions 600-11 to 600-14, 600-21, 600-24, 600-31, 600-34, and 600-11 to 600 14 and the control condition A is set for the imaging regions 600-22, 600-23, 600-32, and 600-33, for example.

The control condition for the internal non-imaging regions 610-*ij* is the same as the control condition for the imaging regions 600-*ij* including the internal non-imaging regions 610-*ij*. For example, the control condition for the internal non-imaging region 610-11 is B and the control condition for the imaging region 600-11 including the internal non-imaging region 610-11 is also B. The control condition A is set for the external non-imaging regions 610-L1, 610-L2, 610-C1, and 610-C2, for example.

The dotted lines having a black circle dot on each end indicate that the imaging region 600-*ij* and the non-imaging region 610-*pq* where the black circle dots are present in the row direction have corresponding black level correction. The imaging region 600-*ij* where the black circle dot is located is referred to as a "reference origin imaging region 600-*ij*" for black level correction and the non-imaging region 610-*pq* where the black circle dot is located is referred to as a "reference destination non-imaging region 610-*pq*" for black level correction (similarly applies to one-dot-chain lines with black circle dots on both ends to be mentioned later).

Also, although not depicted with the dotted line or one-dot-chain line with black circle dots on both ends, the internal non-imaging regions 610-*ij* have, as the "reference origin imaging regions 600-*ij*," the imaging regions 600-*ij* including the internal non-imaging regions 610-*ij*. Thus, for example, the internal non-imaging region 610-11 is the reference destination imaging region of the imaging region 600-11 including the internal non-imaging region 610-11.

A pixel group arranged in the row direction is selected at the same timing for each row selection circuit or block 202, and outputs a pixel signal. Thus, the reference origin imaging region 600-*ij* and the reference destination external non-imaging region 610-Lp are considered to have a correlation with regard to the dark current or the like. This similarly applies to the reference origin imaging region 600-*ij* and the reference destination internal non-imaging region 610-*ij*. Thus, if the output signal from the reference origin imaging region 600-*ij* is subjected to black level correction, then by subtracting the output signal coming from the reference origin imaging region 600-*ij* using the output signal from the reference destination external non-imaging region 610-Lp or the reference destination internal non-imaging region 610-*ij*, it is possible to perform high accuracy black level correction based on the reference origin imaging region 600-*ij*.

Also, the one-dot-chain lines having a black circle dot on each end indicate that the imaging regions 600-*ij* where the black circle dots are present refer to the control condition of the external non-imaging regions 610-Cq in the column direction.

The pixel group arrayed in the column direction is connected to the same column read line and outputs respective analog signals, which are converted by the same A/D converter to digital signals. Thus, the reference origin imaging region 600-*ij* and the reference destination external non-imaging region 610-Cq are considered to have a correlation with regard to the dark current or the like. This similarly applies to the reference origin imaging region 600-*ij* and the reference destination internal non-imaging region 610-*ij*.

Thus, if the output signal from the reference origin imaging region 600-*ij* is subjected to black level correction, then by subtracting the output signal coming from the reference origin imaging region 600-*ij* using the output signal of the reference destination external non-imaging region 610-Cq or the reference destination internal non-imaging region 610-*ij*, it is possible to perform high accuracy black level correction based on the reference origin imaging region 600-*ij*.

As described above, the number of internal non-imaging regions 610-*ij* is less than the number of imaging regions 600-*ij*. Thus, one internal non-imaging region 610-*ij* can be associated with one or more imaging regions 600-*ij* in performing black level correction. Whether to set the row direction or column direction external non-imaging regions 610-*pq* as the reference destination for the imaging regions 600-*ij* may be set in advance, and may be set according to the control conditions of the respective imaging regions 600-*ij* and the respective non-imaging regions 610-*pq*. Alternatively, among the output signals of the row direction and column direction non-imaging regions 610-*pq*, the larger value, the smaller value, or an average value may be used for the imaging regions 600-*ij*.

In particular, in FIG. 26, the imaging regions 600-*ij* in the center of the imaging pixel region 600 have, as the reference destination, the external non-imaging region 610-*pq*, and the imaging regions 600-*ij* surrounding the center have, as the reference destination, the internal non-imaging regions 610-*ij* present in the imaging regions 600-*ij*. The reason is that the primary subject appears in the center of the active imaging region 600, and imaging plane phase difference detection pixels that focus on the primary subject appear more frequently in the center of the imaging pixel region 600 than in the surrounding imaging regions 600-11 to 600-14, 600-21, 600-24, 600-31, 600-34, and 600-41 to 600-44.

<Correction Table>

FIG. 27 is a descriptive drawing showing an example of a correction table according to Embodiment 7. A correction table 2700 is a table in which a correlation value 1405 is set for each combination of a reference origin imaging region 1401, a reference origin control condition 1402, a reference destination non-imaging region 1403, and a reference destination control condition 1404.

The reference origin imaging region 1401 stores the reference origin imaging region 600-*ij* as a value. The reference origin control condition 1402 stores the control condition of the reference origin imaging region 600-*ij* as a value. The reference destination non-imaging region 1403 stores the internal non-imaging region 610-*ij* or the external non-imaging region 610-*pq* serving as the reference destination of the reference origin imaging region 600-*ij* as a value. The reference destination control condition 1404 stores the control condition of the internal non-imaging region 610-*ij* or the external non-imaging region 610-*pq* as a value.

The correlation value 1405 stores a value (correlation value r(ijX, ijY), correlation value r(ijX, LpY), or correlation value r(ijX, CqY); X is the reference origin control condition 1402 and Y is the reference destination control condition 1404) indicating the correlation between the reference origin imaging region 1401 for which the reference origin control condition 1402 was set and the reference destination non-imaging region 1403 for which the reference destination control condition 1404 was set.

The correlation value r(ijX, ijY), the correlation value r(ijX, LpY), or the correlation value r(ijX, CqY) is sometimes simply referred to as the correlation value r. In the case of the correlation value r, a value closer to 1.0 indicates a greater correlation between the reference origin imaging region 1401 and the reference destination non-imaging region 1403, and values further from 1.0 indicate a lower correlation between the reference origin imaging region 1401 and the reference destination non-imaging region 1403.

Here, the output signal from the reference destination internal non-imaging region 610-*ij* or the reference destination external non-imaging region 610-*pq* is Q and the noise component after correction is P. The relationship between P and Q is represented by the above formula (1).

If the reference destination non-imaging region 1403 and the reference origin imaging region 1401 are included, then the correlation value r is close to 1.0. In FIG. 26, for example, if the reference origin imaging region 1401 is the imaging region 600-11, then if the reference destination non-imaging region 1403 is the non-imaging region 610-11, then the correlation value r is closer to 1.0 compared to a case in which the reference destination non-imaging region 1403 is the non-imaging region 610-12. This is because, if the reference destination non-imaging region 1403 and the reference origin imaging region 1401 are included, then reading is performed along the same column read line.

If the reference origin imaging region 1401 and the reference destination non-imaging region 1403 are in the same row, then the correlation value r is close to 1.0. In FIG. 26, for example, if the reference origin imaging region 1401 is the imaging region 600-11, then if the reference destination non-imaging region 1403 is the non-imaging region 610-11, then the correlation value r is closer to 1.0 compared to a case in which the reference destination non-imaging region 1403 is the non-imaging region 610-22. This is because in the same row, the signal is read by the column read line at the same timing.

Also, the closer the reference origin imaging region 1401 and the reference destination non-imaging region 1403 are to each other, the closer the correlation value r is to 1.0. In FIG. 26, for example, if the reference origin imaging region 1401 is the imaging region 600-11, then if the reference destination non-imaging region 1403 is the non-imaging region 610-12, then the correlation value r is closer to 1.0 compared to a case in which the reference origin imaging region 1401 is the imaging region 600-14. This is thought to be because the closer the pixel positions are, the more similar the characteristics thereof are.

Also, if the reference origin control condition 1402 is the reference destination control condition 1404, then the correlation value r is a value close to 1.0. Specifically, if the reference origin control condition 1402 and the reference destination control condition 1404 are control conditions of the same type but different values, for example, then the correlation value r is closer to 1.0 than a case in which the reference origin control condition 1402 and the reference destination control condition 1404 are of different types. This is because if the control conditions are of the same type, then the operation condition of the reference origin imaging region 1401 is believed to be similar to the operation condition of the reference destination non-imaging region 1403.

As described above, according to Embodiment 7, it is possible to execute black level correction using the non-imaging region 610-*pq* outside of the correlated imaging pixel region 600 for each of the imaging regions 600-*ij* of the imaging pixel region 600. Thus, it is possible to increase the accuracy of black level correction of each of the imaging regions 600-*ij*.

The present invention is not limited to the content above, and the content above may be freely combined. Also, other aspects considered to be within the scope of the technical concept of the present invention are included in the scope of the present invention.

DESCRIPTION OF REFERENCE CHARACTERS

100 image capture element
102 color filter
104 PD
201 pixel
201-1 imaging pixel
201-2 PD-equipped optical black pixel
201-2 non-PD optical black pixel
202 block
600 imaging pixel region
600-*ij* imaging region
610 optical black pixel region
610-*pq* non-imaging region
900 light-shielding layer
910 signal processing unit
911 driver circuit
912 control unit

What is claimed is:

1. An image capture element, comprising:

a plurality of imaging regions each having:

(i) a plurality of first pixels that each include a first photoelectric converter configured to convert light to an electric charge and a first circuit that is connected to the first photoelectric converter, the first pixels being arrayed in a first direction and a second direction that intersects with the first direction, and (ii) a first control line that is connected to the plurality of first pixels and to which a signal that controls the plurality of first pixels is output; and a plurality of light-shielding pixel regions each having:

(i) a plurality of second pixels that each include a second photoelectric converter that is shielded from light and a second circuit that is connected to the second photoelectric converter, the second pixels being arrayed in the first direction and the second direction, and (ii) a second control line that is connected to the plurality of second pixels and to which a signal that controls the second pixels is output; and a signal processor configured to correct output signals from the plurality of imaging regions based on output signals from the plurality of light-shielding pixel regions, wherein:

the plurality of the imaging regions are arranged in the first direction and the second direction;

the plurality of light-shielding pixel regions are arranged in the first direction and the second direction and outside of an imaging pixel region, which includes all of the plurality of imaging regions;

a first imaging region of the plurality of imaging regions and a second imaging region of the plurality of imaging regions are capable of being set with different control conditions;

among the plurality of light shielding pixel regions, a first light-shielding pixel region that outputs a signal for correcting a signal from the first imaging region and a second light-shielding pixel region that outputs a signal for correcting a signal from the second imaging region are capable of being set with different control conditions;

the first light-shielding pixel region is capable of being set with a control condition independently of a control condition for the first imaging region; and the signal processor determines a correction method for correcting the output signals from the plurality of imaging regions based on correction information including information relating to the control conditions of the plurality of light-shielding pixel regions and information relating to the control conditions of the plurality of imaging regions.

2. The image capture element according to claim 1, comprising:

the imaging pixel region having the plurality of imaging regions, in which a control condition is set for each of the plurality of imaging regions, and two or more types of the control conditions are set for the plurality of imaging regions; and an optical black pixel region having a number of the plurality of light-shielding pixel regions that is greater than or equal to a number of the plurality of imaging regions, in which a same control condition as a reference origin imaging region is set for each of the plurality of light-shielding pixel regions, and two or more types of the control conditions are set for the plurality of light-shielding pixel regions.

3. The image capture element according to claim 2, wherein the reference origin imaging region and a reference destination light-shielding pixel region that is referred to by the reference origin imaging region are arrayed in a prescribed direction.

4. The image capture element according to claim 3, wherein the prescribed direction is a read direction of an output signal from a pixel group constituting the reference origin imaging region and the reference destination light-shielding pixel region.

5. The image capture element according to claim 3, wherein the prescribed direction is a direction orthogonal to a read direction of an output signal from a pixel group constituting the reference origin imaging region and the reference destination light-shielding pixel region.

6. The image capture element according to claim 1, wherein each of the light-shielding pixel regions has a first optical black pixel group, each pixel of which has a photoelectric converter, and a second optical black pixel group, each pixel of which does not have the photoelectric converter.

7. The image capture element according to claim 6, wherein:

among a third of the light-shielding pixel regions and a fourth of the light-shielding pixel regions that are adjacent to each other, a first partial region where the third light-shielding pixel region and the fourth light-shielding pixel region are adjacent to each other is either one of the first optical black pixel group and the second optical black pixel group; and among the third light-shielding pixel region and the fourth light-shielding pixel region, a second partial region other than the first partial region is another of the first optical black pixel group and the second optical black pixel group.

8. The image capture element according to claim 1, wherein the signal processor is configured to perform black level correction on an output from the first imaging region based on an output from the first light-shielding pixel region.

9. The image capture element according to claim 1, wherein:

the signal processor is configured to determine, based on the correction information, from among the plurality of light-shielding pixel regions, the first light-shielding pixel region to be used for correcting the output signal from the first imaging region and the second light-shielding pixel region to be used for correcting the output signal from the second imaging region.

10. The image capture element according to claim 9, wherein:

the correction information includes position information relating to positions of the plurality of imaging regions and the plurality of light-shielding pixel regions; and the signal processor is configured to determine, based on the position information, from among the plurality of light-shielding pixel regions, the first light-shielding pixel region and the second light-shielding pixel region.

11. The image capture element according to claim 9, wherein:

the correction information includes control information relating to the control conditions set for each of the plurality of imaging regions and the control conditions set for each of the plurality of light-shielding pixel regions; and the signal processor is configured to determine, based on the control information, from among the plurality of light-shielding pixel regions, the first light-shielding pixel region and the second light-shielding pixel region.

12. The image capture element according to claim 1, wherein the signal processor is configured to correct the signal output from the first imaging region based on a distance between the first imaging region and the first light-shielding pixel region.

13. The image capture element according to claim 1, wherein the signal processor is configured to correct the signal output from the first imaging region based on information relating to a circuit used when the signal was output from the first imaging region and information relating to a circuit used when the signal was output from the first light-shielding pixel region.

14. The image capture element according to claim 1, wherein the signal processor is configured to correct the signal output from the first imaging region based on information relating to temperature.

15. The image capture element according to claim 1, wherein the signal processor is configured to correct the signal output from the first imaging region based on information relating to ISO sensitivity.

16. An imaging device comprising the image capture element according to claim 1.

17. An image capture element, comprising:

a plurality of imaging regions each having:

(i) a plurality of first pixels that each include a first photoelectric converter configured to receive light from an optical system and convert the received light to an electric charge and a first circuit that is connected to the first photoelectric converter, the first pixels being arrayed in a first direction and a second direction that intersects with the first direction; and (ii) a first control line that is connected to the plurality of first pixels and to which a signal that controls the plurality of first pixels is output; and a plurality of light-shielding pixel regions each having:

(i) a plurality of second pixels that each include a second photoelectric converter that is shielded from light and a second circuit that is connected to the second photoelectric converter, the second pixels being arrayed in the first direction and the second direction; and (ii) a second control line that is connected to the plurality of second pixels and to which a signal that controls the second pixels is output, wherein:

the plurality of the imaging regions are arranged in the first direction and the second direction;

the plurality of light-shielding pixel regions are arranged in the first direction and the second direction and outside of an imaging pixel region that includes all of the plurality of imaging regions;

different control conditions are capable of being set for each of the plurality of imaging regions;

each of the plurality of light-shielding pixel regions is capable of being set with a control condition independently of the imaging region whose output signal is corrected using a signal output from the light-shielding pixel region;

each of the light-shielding pixel regions has a first optical black pixel group, each pixel of which has a photoelectric converter, and a second optical black pixel group, each pixel of which does not have the photoelectric converter; and among a first of the light-shielding pixel regions and a second of the light-shielding pixel regions that are adjacent to each other, a first partial region where the first light-shielding pixel region and the second light-shielding pixel region are adjacent to each other is either one of the first optical black pixel group and the second optical black pixel group, and a second partial region other than the first partial region is another of the first optical black pixel group and the second optical black pixel group.

* * * * *